US012477345B2

(12) United States Patent
Gurney et al.

(10) Patent No.: US 12,477,345 B2
(45) Date of Patent: Nov. 18, 2025

(54) DEVICE, SYSTEM, AND METHOD TO CONTROL OPERATION OF A BASE STATION

(71) Applicant: MOTOROLA SOLUTIONS, INC., Chicago, IL (US)

(72) Inventors: David P. Gurney, Carpentersville, IL (US); David G. Wiatrowski, Woodstock, IL (US); Chad Trank, Queen Creek, AZ (US); Don Weerasiri, Schaumburg, IL (US); Eric McCoy, Elgin, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 304 days.

(21) Appl. No.: 18/371,658

(22) Filed: Sep. 22, 2023

(65) Prior Publication Data
US 2025/0106641 A1 Mar. 27, 2025

(51) Int. Cl.
*H04W 16/02* (2009.01)
*H04W 12/08* (2021.01)
*H04W 12/63* (2021.01)
*H04W 52/34* (2009.01)

(52) U.S. Cl.
CPC .......... *H04W 16/02* (2013.01); *H04W 12/08* (2013.01); *H04W 12/63* (2021.01); *H04W 52/34* (2013.01)

(58) Field of Classification Search
CPC ..... H04W 16/02; H04W 12/08; H04W 12/63; H04W 52/34; H04W 16/14
See application file for complete search history.

(56) References Cited

U.S. PATENT DOCUMENTS

| 10,560,846 | B2* | 2/2020 | Vutukuri | H04W 12/062 |
| 2011/0124291 | A1* | 5/2011 | Gurney | H04W 16/14 |
| | | | | 455/63.2 |
| 2019/0109832 | A1* | 4/2019 | Shattil | H04W 12/08 |
| 2021/0211880 | A1 | 7/2021 | Khawer et al. | |

OTHER PUBLICATIONS

Li, Yong, and Min Chen. "Software-defined network function virtualization: A survey." Ieee access 3 (2015): 2542-2553. (Year: 2015).*
ECFR, "Part 90, Subpart Z—Wireless Broadband Services in the 3650-3700 MHz Band", ecfr.gov. Aug. 31, 2023, URL: https:www.ecfr.gov/current/title-47/chapter-I/subchapter-D/part-90/subpart-Z.
ECFR, "Part 96—Citizens Broadband Radio Service", ecfr.gov. Aug. 31, 2023, URL: https://www.ecfr.gov/current/title-47/chapter-I/subchapter-D/part-96.

* cited by examiner

*Primary Examiner* — Sharad Rampuria
(74) *Attorney, Agent, or Firm* — PERRY + CURRIER INC.

(57) ABSTRACT

A device, system and method to control operation of a base station is provided. A computing devices communicates, to two or more spectrum controllers, respective authorization requests associated with a physical base station at a given location, the two or more spectrum controllers managed by different respective entities. The computing device receives, from the two or more spectrum controllers, one or more respective spectrum controller responses to the respective authorization requests. When the one or more respective spectrum controller responses include at least one authorization associated with the physical base station, the computing device provides, to the physical base station, permission to operate via respective RF transmissions.

16 Claims, 8 Drawing Sheets

DEVICE, SYSTEM, AND METHOD TO CONTROL OPERATION OF A BASE STATION

BACKGROUND

Base stations for certain types of broadband networks, such as citizen broadband radio service (CBRS) networks, may be subject to certain restrictions. For example, for such base stations to operate, authorization must be periodically granted by a spectrum controller, which, in relation to a CBRS network, may be referred to as a spectrum access system (SAS) controller, and which may grant authorizations periodically, for example via a different network, such as the Internet. When authorization from a spectrum controller is not received (e.g., within a given time period, such as according to a given periodicity), the base station must stop operating (e.g., within a respective given time period). However, in some situations, authorization may not be received due to an Internet (or other network) outage, technical problems with the SAS, and the like, and hence a base station may needlessly be forced to stop operating.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
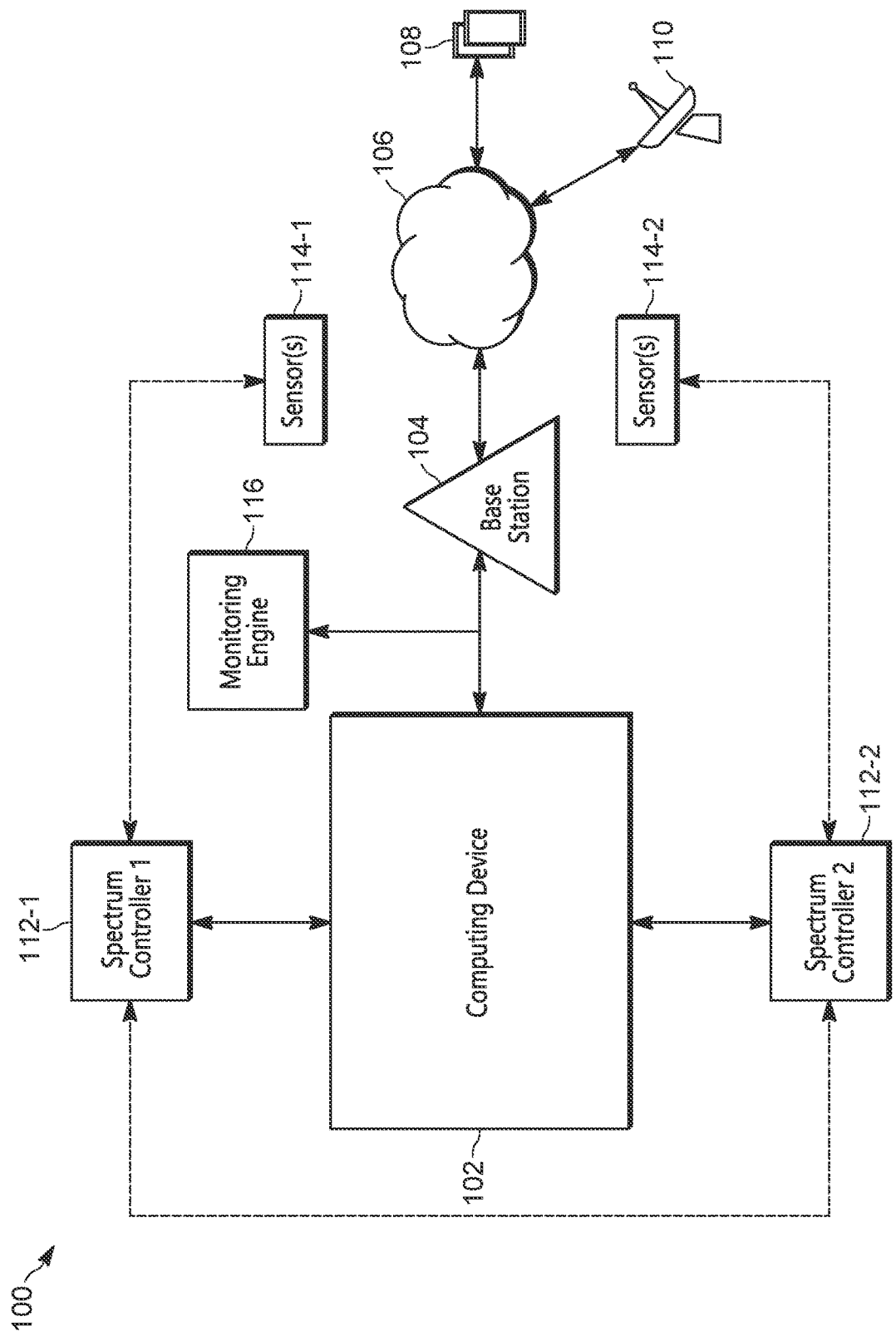
FIG. 1 is a system to control operation of a base station, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Spectrum sharing systems are growing in popularity, since they allow secondary use of under-utilized spectrum without generally requiring the relocation of incumbent services. In general, spectrum controllers are utilized to coordinate multiple users of shared spectrum, among other technologies. Base stations for certain types of broadband networks, such as citizens broadband radio service (CBRS) networks, may be subject to certain operating restrictions when utilizing shared spectrum. Using CBRS as an example, CBRS networks utilize a three-tiered spectrum sharing approach, where higher tier users have priority to access spectrum over lower tier users. In particular, some bandwidth of a CBRS network may be utilized for first tier incumbent systems, such as government operated radar systems, and certain ground-based satellite stations, while other under-utilized bandwidth may be reserved for second tier communication systems, such as systems operated by certain priority access licensee (PAL) holders. A third tier of communication systems, which are known as general authorized access (GAA) users, may also use CBRS spectrum not utilized by higher tiers. PAL spectrum users have priority access over GAA spectrum users. Both the second (PAL) and third (GAA) tier users are generally considered secondary users of the spectrum in the CBRS case (with respect to incumbent operation in the band, which has the highest priority). All secondary users of the spectrum, such as CBRS base stations, must not cause radio-frequency (RF) interference to higher tier communication systems using the spectrum. For example, such secondary base stations (used by second and third tier communication devices) may communicate via a broadband network, and such base stations may operate according to certain periodic authorizations received from a spectrum controller, which, in relation to a CBRS network, may be referred to as a spectrum access system (SAS) controller, and which may grant authorizations. When authorizations are not received according to a given periodicity, and/or within a given time period, the base station must stop operating, for example within a respective given time period. Other examples of spectrum sharing approaches and a spectrum controller employing similar methods include the Automated Frequency Coordinator (AFC) function utilized in the 6 GHz band (e.g., 5925 MHz to 6875 MHz). The AFC function also serves to grant permission to utilize the band, similar to an SAS function.

A domain proxy device generally interfaces between base stations and the spectrum controller, and may aggregate multiple base stations' spectrum authorization requests to a spectrum controller. In particular, the authorizations for a base station may be requested periodically and received via a domain proxy device, which may be configured to communicate with only one spectrum controller. When an authorization from the one spectrum controller is not received, due to an Internet (or other network) outage, the one spectrum controller having a system failure, and the like, a base station may needlessly stop operating (e.g., as a permission, corresponding to an authorization, is not received at the base station from the domain proxy device), which may cause second tier and/or third tier communication devices, that use the base station, to lose communications. Thus, there exists a need for an improved technical method, device, and system to control operation of a base station.

Hence, provided herein is a device, system and method to control operation of a base station. In particular, a system is provided that includes a computing device in communication with a base station, which may be providing communications to a broadband network, such as a CBRS network (e.g., which operates in a frequency band of 3550 MHz to 3700 MHz), for certain communication devices, such as second and third tier communication devices. First tier communication devices may also be using the broadband network. The computing device may be in communication with a plurality of spectrum controllers, such as a plurality of SAS controllers, configured to control the RF transmissions and/or RF bandwidth usage of the broadband network at a location of the base station. The spectrum controllers may also employ sensor networks, such as an array of sensors, (e.g., to detect incumbent transmissions and the like). The spectrum controllers and respective sensors may be operated by different entities, however, in some examples, the spectrum controllers may be in communication to coordinate RF transmissions and/or RF bandwidth usage of the broadband network at a location of the base station.

However, in contrast to the prior art, rather than request authorization from only one spectrum controller, the computing device may request authorization from two or more spectrum controllers.

In a particular example, respective authorization requests provided by the computing device to the two or more spectrum controllers may be associated with respective virtual base stations representing the base station (e.g., hereafter interchangeably referred to as a physical base station) at the given location. Such virtual base stations may be associated with the same operational capabilities as the physical base station, such as a same maximum RF transmission power level, same bandwidth capabilities, same antenna beamwidth capabilities, and the like, though such operational capabilities of the virtual base stations may alternatively be different (e.g., with operational capabilities being less than, but within respective ranges, of the operational capabilities as the physical base station). The respective virtual base stations may have different respective serial numbers, provided in the respective authorization requests, such that the two or more spectrum controllers, which may be in communication with each other, do not confuse the respective authorization requests as being for a same base station, which may lead to confusion at the two or more spectrum controllers. Indeed, in the context of CBRS networks, the virtual base stations generally have different serial numbers as the SASs may be restricted from allowing a same physical base station (e.g., of a given serial number) from being registered on more than one SAS. In this manner, the spectrum controllers and/or SASs may consider that more than one base station is located at the given location of the physical base station, and determine operating parameters of the virtual base stations (independently or respectively), accordingly, as described herein.

In particular, the two or more spectrum controllers to which authorization requests are provided by the computing device, may be processing sensor data from their respective sensors, and, presuming that the sensor data indicates that spectrum is available at the given location of the physical base station, and/or that operational parameters associated with the physical base station may be determined that won't interfere with communications of the higher tier devices, the two or more spectrum controllers may respond to the request for authorization with respective spectrum controller responses, granting authorization for the physical base station to operate, though such authorizations may be particular to the virtual base stations representing the physical base station. In some cases, the authorization from one spectrum controller may differ from another, due to a variety of factors (e.g., differing sensor results, differing user database values, differing implementations, etc.).

In addition, only one of the respective spectrum controller responses may be received at the computing device from one spectrum controller, due to a variety of reasons, such as an Internet outage and the like between the computing device and other spectrum controllers, the other spectrum controllers having technical issues, and the like. However, only one spectrum controller response that includes an authorization is generally sufficient for authorization and/or permission to be granted to the physical base station (e.g., a virtual base station) to operate, and the computing device may responsively provide, to the physical base station, permission to operate. The terms "permission" and/or "permission to operate" are used herein with respect to the physical base station being provided with authorization to operate, to distinguish between authorizations received from the spectrum controllers via the spectrum controller responses.

A spectrum controller response may further include respective operating parameters for the physical base station (e.g., a virtual base station), which, for example, may define various operating parameters for the physical base station to operate via RF transmissions. In some examples, such respective operating parameters may be determined in conjunction with the spectrum controllers communicating, for example via the Internet, and the like, and may include, but are not limited to, respective transmission power level parameters (e.g., maximum effective isotropic radiated power (EIRP) levels), respective bandwidth grant parameters, respective antenna beamwidth grant parameters, and the like. In particular, the spectrum controllers may determine the respective operating parameters on the assumption that each are for a respective single base station (e.g., a respective virtual base station), at the given location of the physical base station, and are selected such that RF transmissions for the respective single base stations meet certain conditions, which may include, but are not limited to, not interfering with higher (e.g., first and/or second) tier communication devices, which may be in the region of the physical base station. In particular, when respective operating parameters are determined for a plurality of virtual base stations at the given location of the physical base station, the respective operating parameters may be determined such that the total respective operating parameters may meet the certain conditions. This may also depend on the particular spectrum band. For example, in the AFC function utilized in the 6 GHz band, a spectrum controller may only consider single exposure interference effects of a base station (without considering the effects of multiple base stations in an area); in these examples, the spectrum controllers may not be in communication with each other. In the CBRS band, a spectrum controller may consider aggregate interference effects from multiple secondary users; in these examples, the spectrum controllers may be in communication.

When the computing device receives a plurality of spectrum controller responses and hence a plurality of respective operating parameters, for a given type of an operating parameter, the computing device may select one operating parameter or combine the operating parameters as described herein, and include, in the permission to operate, provided to the physical base station, an indication of one or more of the respective operating parameters (e.g., as selected and/or combined) to configure the physical base station to provide respective RF transmissions according to the one or more of the respective operating parameters (e.g., as selected and/or combined).

In this manner, when communication is lost between the computing device and all but one of the spectrum controllers, the physical base station may be controlled to operate, and/or may continue to operate.

However, when the one or more respective spectrum controller responses do not include at least one authorization for the physical base station, and/or are not received at the computing device, the computing device may provide, to the physical base station, a command to control the physical base station to stop transmitting. However, the computing device may continue to send respective authorization requests to the spectrum controllers, and when one or more respective spectrum controller responses that include at least one authorization are later received, the computing device may provide, to the physical base station, a command to control the physical base station to continue operating and/or to again start operating.

Furthermore, the authorizations may be requested periodically, and respective permissions provided to the physical base station periodically, and hence the respective permissions may be colloquially referred to as heartbeat permissions. However, in some examples, an initial spectrum authorization request may be made to a spectrum controller, and the spectrum controller may then periodically provide authorizations (e.g., without further spectrum authorization requests). In some examples, when the heartbeat permissions are not received at the base station according to particular conditions, such as according to a given periodicity, the physical base station must stop operating within a given time period. Such a decision to stop operating may occur via computing resources at the physical base station, or via a monitoring engine associated with the physical base station. Use of a monitoring engine may occur when the physical base station is operated in certain modes, in which the physical base station itself does not directly monitor the heartbeat permissions. However, the physical base station may directly monitor the heartbeat permissions.

An aspect of the present specification provides a method comprising: communicating, via a computing device, to two or more spectrum controllers, respective authorization requests associated with a physical base station at a given location, the two or more spectrum controllers managed by different respective entities; receiving, via the computing device, from the two or more spectrum controllers, one or more respective spectrum controller responses to the respective authorization requests; and when the one or more respective spectrum controller responses include at least one authorization associated with the physical base station, providing, via the computing device, to the physical base station, permission to operate via respective RF transmissions.

Another aspect of the present specification provides a computing device comprising: a controller; and a computer-readable storage medium having stored thereon program instructions that, when executed by the controller, cause the computing device to perform a set of operations comprising: communicating, to two or more spectrum controllers, respective authorization requests associated with a physical base station at a given location, the two or more spectrum controllers managed by different respective entities; receiving, from the two or more spectrum controllers, one or more respective spectrum controller responses to the respective authorization requests; and when the one or more respective spectrum controller responses include at least one authorization associated with the physical base station, providing, to the physical base station, permission to operate via respective RF transmissions.

Another aspect of the present specification provides a system comprising: a physical base station at a given location; a computing device configured to: communicate, to two or more spectrum controllers, respective authorization requests associated with the physical base station; receive, from the two or more spectrum controllers, one or more respective responses to the respective authorization requests; and when the one or more respective responses include at least one authorization associated with the physical base station, provide, to the physical base station, permission to operate via respective radio-frequency (RF) transmissions, wherein the two or more spectrum controllers are managed by different respective entities.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus that may be on or off-premises, or may be accessed via cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions, which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Herein, the term "engine" is understood to refer to hardware, and/or a combination of hardware and software (e.g., a combination of hardware and software includes software hosted at hardware, such as a software module that is stored at a processor-readable memory implemented or interpreted by a processor), or hardware and software hosted at hardware and/or implemented as a system-on-chip architecture and the like.

Further advantages and features consistent with this disclosure will be set forth in the following detailed description, with reference to the drawings.

Attention is directed to FIG. 1, which depicts an example system 100 to control operation of a base station. The various components of the system 100 are in communication via any suitable combination of wired and/or wireless communication links, and communication links between components of the system 100 are depicted in FIG. 1, and throughout the present specification, as double-ended arrows between respective components; the communication links may include any suitable combination of wireless and/or wired links and/or wireless and/or wired communication networks, and the like, unless otherwise indicated.

The system 100 comprises a computing device 102 in communication with a physical base station 104 at a given location, and the physical base station 104 may comprise a transceiver that is a communication point of a wireless communication network 106 (e.g., interchangeably referred to hereafter as the network 106) to provide wireless communications for one or more wireless communication devices 108 (e.g., interchangeably referred to hereafter as the communication devices 108) via the network 106.

The computing device 102 may comprise one or more servers and/or cloud computing devices, which may be remote from the physical base station 104, and in communication with the physical base station 104 via one or more wired and/or wireless networks different from the network 106, and which may include, but is not limited to, the Internet. An example configuration of the computing device 102 is described in more detail with respect to FIG. 2.

The physical base station 104 may comprise a plurality of antennas, for example in the form of a plurality of sectors, as understood by persons of skill in the art; for example, as depicted, the physical base station 104 is triangular, and may be composed to three sectors, though any suitable number of sectors is within the scope of the present specification, including, but not limited to, as few as one antenna and/or one sector. Note that each antenna may contain multiple ports, in order to support multiple input, multiple output (MIMO), beam steering or other techniques. Furthermore, the physical base station 104 may have certain operational capabilities, such as a maximum RF transmission power, bandwidth capabilities, beamwidth capabilities (such as switchable antennas or adaptive antennas), and the like, and which may include, but is not limited to, antenna heights, pointing angles, bandwidths, patterns, and the like.

Figure 4:
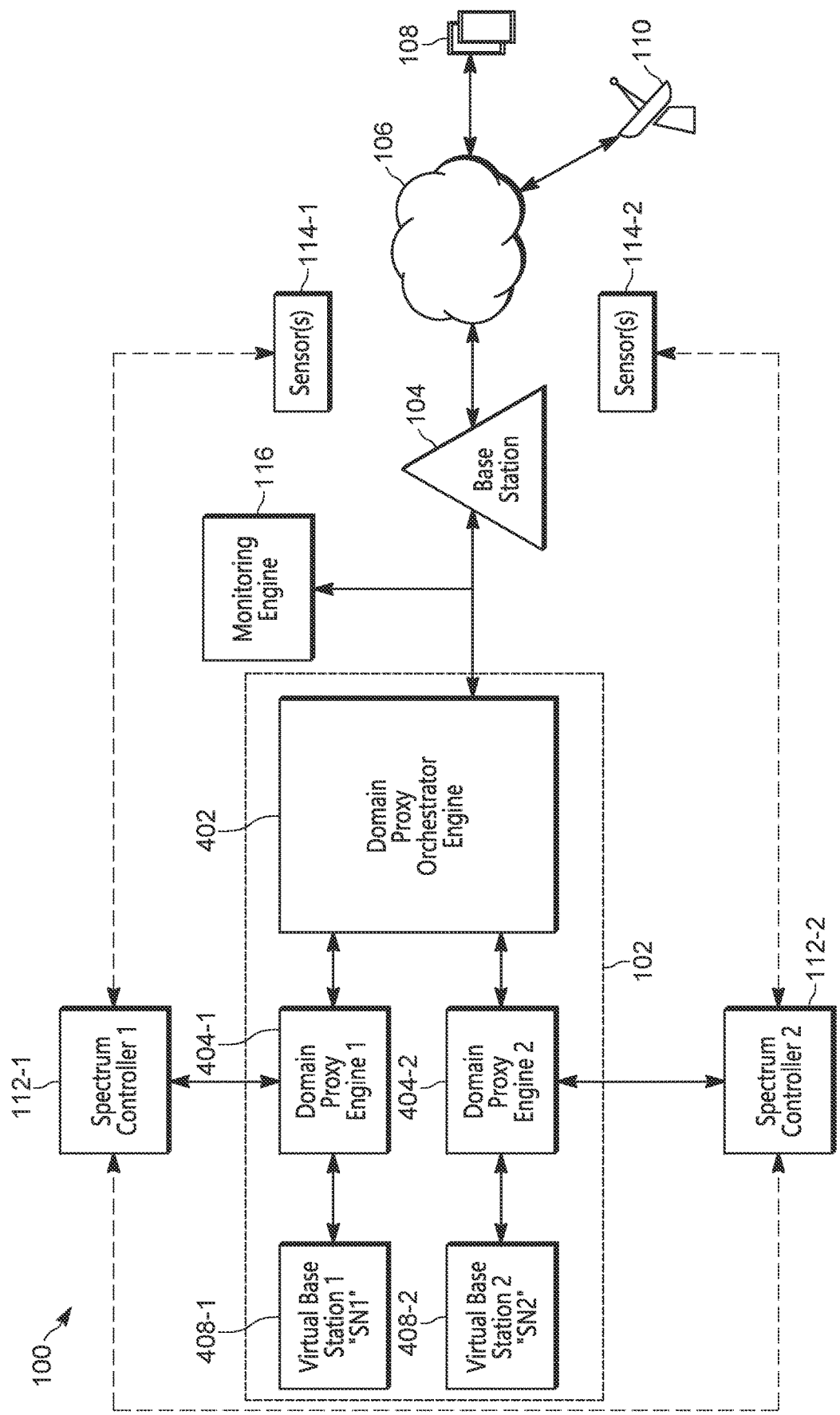
FIG. 4 depicts a particular implementation of the system of FIG. 1, in accordance with some examples.

It is understood that the term "physical" base station 104 is used herein, to distinguish the physical base station 104 from virtual base stations that represent the physical base station 104 at the given location of the physical base station 104, as described herein with respect to at least FIG. 4.

The network 106 may comprise a broadband wireless network, which provides communications for the communication devices 108. For example, the network 106 may include, but is not limited to, a CBRS communication network and/or a CBRS network; in these examples, the physical base station 104 may comprise a Citizens Broadband Radio Service Device (CBSD), and the like. The CBRS band spectrum of 150 MHz (3550 MHz to 3700 MHZ) may be divided into fifteen 10 MHz channels; in these examples, the physical base station 104 and the communication devices 108, may be configured to operate on any number of the channels. Also depicted are one or more incumbent systems 110, which may generally operate on any of these channels, however, in the case of the CBRS band, incumbent radar systems generally operate in the lower 100 MHz of the band (or below those frequencies), while fixed satellite station (FSS) receive sites generally operate in the upper 50 MHz of the band. Hence the one or more incumbent systems 110 may comprise one or more incumbent radar systems (e.g., which may be mobile) and/or ground-based radar systems and/or one or more FSS receive sites (e.g., which may be fixed), and the like, and hence the one or more incumbent systems 110 are depicted herein in the form of a radar tower, and the like.

In particular examples, the communication devices 108 may comprise radios, mobile phone-type devices, customer premise equipment (CPE), and the like operated, for example, by an entity authorized to use the network 106 as a general authorized access user, and/or a priority access license user. In the context of a CBRS communication network (e.g., the network 106 may comprise a CBRS communication network), the communication devices 108 may comprise second or third tier spectrum users.

In general, incumbent systems 110 in the CBRS band may comprise naval radar systems (e.g., on aircraft carriers, and hence may be mobile), ground-based radar systems, FSS receive sites, and potentially grandfathered incumbent users (e.g., Federal Communications Commission Part 90 Subpart Z users). There may generally be no restrictions on incumbent users also using CBRS spectrum as second or third tier users. In such cases, those users are generally treated equally to other second or third tier users.

Hence, in a particular example, the network 106 may comprise a CBRS communication network, and the communication devices 108 may comprise second tier or third tier communication devices.

Regardless, it is understood that the incumbent systems 110 are given priority within the system 100, and in particular, the incumbent systems 110 are given priority over the base stations 104 and communication devices 108, to utilize the shared spectrum (e.g., of the network 106), and the physical base station 104 is controlled accordingly, as described herein.

For example, as depicted, the computing device 102 is generally configured to communicate with a plurality of spectrum controllers 112-1, 112-2, interchangeably referred to hereafter, collectively, as the spectrum controllers 112 and, generically, as a spectrum controller 112. Alternatively, and/or in addition, the spectrum controller 112-1 is interchangeably referred to hereafter as a first spectrum controller 112-1, and the spectrum controller 112-2 is interchangeably referred to hereafter as a second spectrum controller 112-2. This convention is used elsewhere in the present specification.

For example, as depicted, the first spectrum controller 112-1 may be in communication with a first array of one or more sensors 114-1 in the region of the given location of the physical base station 104, and the second spectrum controller 112-2 may be in communication with a second array of one or more sensors 114-2. The sensors 114-1, 114-2 are interchangeably referred to hereafter, collectively, as the sensors 114 and, generically, as a sensor 114. Alternatively, and/or in addition, the sensors 114-1 are interchangeably referred to hereafter as first sensors 114-1, and/or a first array of sensors 114-1, and the sensors 114-2 are interchangeably referred to hereafter as second sensors 114-2, and/or a second array of sensors 114-2. However, in some examples (e.g., when the spectrum controllers 112 are AFC-based) the sensors 114 may be optional, and hence communication links between the sensors 114 and respective spectrum controllers 112 are depicted in dashed lines to indicate such optionality. Furthermore, the first array of one or more sensors 114-1 for form a first sensor network, and the second array of one or more sensors 114-2 may form a second sensor network.

While for simplicity only two spectrum controllers 112 and arrays of respective sensors 114 are depicted, the computing device 102 may be configured to communicate with more than two spectrum controllers 112 in communication with respective arrays of sensor 114. The computing device 102 may implement the aforementioned domain proxy function, to aggregate requests from multiple base station radios to each spectrum controller 112. Hence, hereafter, the computing device 102 may be described as communicating with two or more spectrum controllers 112.

In general, the two or more spectrum controllers 112 are managed by different respective entities (e.g., the first spectrum controller 112-1 is managed by a first entity, and the second spectrum controller 112-2 is managed by a second entity), and the two or more spectrum controllers 112 may optionally be in communication to coordinate radio-frequency (RF) transmissions at the given location of the physical base station 104, as well as other locations. Hence, to indicate such optionality, a communication link between the spectrum controllers 112 is depicted in dashed lines. In particular, when the network 106 comprises a CBRS network the spectrum controllers 112 may comprise respective SAS controllers, and the like and the spectrum controllers 112 may be in communication with each other and the sensors 114 (though such sensors 114 may also be optional in CBRS-based systems). When the network 106 comprises an AFC controlled network, the spectrum controllers 112 may not be in communication with each other and the sensors 114 may not be present.

The sensors 114 may comprise one or more RF sensors and/or RF detectors, and the like, and which may distinguish between, and measure, RF transmissions from respective incumbent systems 110. For example, the sensors 114 may detect specific operating parameters of RF transmissions of the incumbent systems 110 (e.g., radar systems) and provide an indication thereof to a respective spectrum controller 112. In other examples, the locations of incumbent system 110, such as FSS receive sites may be known and/or preconfigured at a spectrum controller 112. When incumbent spectrum usage is detected or known, a spectrum controller 112 may control operating parameters of broadband network base station s (e.g., CBSD) (e.g., such as the base station 104) in order to protect incumbent spectrum usage from undue interference from such operation. The controlled operating parameters may include, but are not limited to, a transmission power level (e.g., a maximum radiated power level), bandwidth usage amount, and an antenna beamwidth, azimuth and the like, of a respective base station 104.

Alternatively, or in addition, the sensors 114 may detect at least a portion of the mobile incumbent systems 110 when they are in the region of the given location of the physical base station 104. For example, the sensors 114 may detect a navy radar system operating on-board an aircraft carrier, and/or other naval vessels, in the region of the given location of the physical base station 104. In these naval vessel examples, the sensors 114 may comprise coastal sensors arranged along a coastline in a region of the given location of the physical base station 104. The sensors 114 may provide an indication of incumbent spectrum usage thereof to a respective spectrum controller 112. The spectrum controller 112 may have access to a database, and the like, which contains the locations and operating parameters (e.g., operating frequencies, bandwidths, antenna characteristics, etc.) of the incumbent systems 110, in association with operating RF parameters of the incumbent systems 110, and hence, enable the spectrum controller 112 to protect said incumbent operation from harmful interference, by controlling broadband network base station 104 operating parameters thereof, which may include, but is not limited to, a radiated power level, an operating frequency, an operating bandwidth, an operating antenna beamwidth, azimuth and the like of the associated base station 104.

Furthermore, it is understood that different arrays of sensors 114 may detect different incumbent systems 110, and hence, different spectrum controllers 112 may determine different incumbent usage of RF spectrum at the given location of the physical base station 104 by the different incumbent systems 110. For example, the first sensors 114-1 may detect a first naval vessel and/or an associated incumbent system 110 that is not detected by the second sensors 114-2, and, vice versa, the second sensors 114-2 may detect a second naval vessel and/or an associated incumbent system 110 that is not detected by the first sensors 114-1, and such detection of the different naval vessels by the sensors 114 may happen simultaneously.

The various spectrum controllers 112 may be in communication to coordinate secondary RF transmissions (e.g., by second or third tier users in the CBRS band) at the given location of the physical base station 104. For example, the spectrum controllers 112 may communicate with each other so that all the spectrum controllers 112 have an indication of all the other secondary base stations determined by all the spectrum controllers 112, and respective operating parameters thereof. Hence, when a given spectrum controller 112 receives a respective authorization request, for example from the computing device 102, on behalf of the physical base station 104, the given spectrum controller 112 may provide a respective spectrum controller response to the authorization request that takes into account RF transmissions from the other secondary base stations operating in the region of the given location of the physical base station 104.

For example, in a registration process, the spectrum controllers 112 may have access to available parameters of the physical base station 104 (or associated virtual base stations, as described herein), such as the physical base station 104 operating location, a maximum (desired) radiated power level, a maximum (desired) occupied bandwidth and/or utilized channels, a maximum (desired) antenna beamwidth, and the like, and which may further include, but is not limited to, antenna height, antenna pointing angles (or azimuth), antenna radiation patterns, and the like of the physical base station 104 (or the associated virtual base stations, as described herein). The spectrum controllers 112 may determine the approved operating parameters of the physical base station 104 (and/or the associated virtual base stations that represents the physical base station 104), which, when the physical base station 104 (and/or the associated virtual base stations) operates according to such operating parameters, causes RF transmissions of the physical base station 104 (and/or the associated virtual base stations) not to interfere with operation of incumbent systems 110. The desired deployment parameters of the physical base station 104 (and/or the associated virtual base stations) may be registered with the two or more spectrum controllers 112 in a registration process and stored in respective memories accessible to the two or more spectrum controllers 112.

Alternatively, for example when the spectrum controllers 112 are AFC-based, the spectrum controllers 112 may provide operating parameters without communicating with each other. For example, such operating parameters may be predetermined heuristically using any suitable technique, including, but not limited to, single exposure interference analysis, and preconfigured at the spectrum controllers 112. Alternatively, or in addition, such operating parameters may be provided by a government organization, and the like. In a context of the United States, such a government organization may be the Federal Communications Commission (FCC) though government organizations in other jurisdictions may provide similar operating parameters.

Returning to the computing device 102 and the physical base station 104, as the physical base station 104 is acting as an access point for the communication devices 108, and as the physical base station 104, and/or the communication devices 108, are understood to be restricted to operations that do not interfere with the incumbent systems 110, at least the physical base station 104 may be required to receive, from a spectrum controller 112, transmission authorization and/or permission for the physical base station 104 to operate, for example according to a given periodicity. In the CBRS band, the required spectrum controller re-authorization rate may be on the order of minutes. If the computing device 102 (or the physical base station 104) cannot obtain authorization to operate within the required period, the physical base station 104 must cease transmission.

For example, the computing device 102, the physical base station 104 and the communication devices 108 may be operated and/or managed by a respective entity (e.g., different from the entities associated with the incumbent systems 110 and the spectrum controllers 112), and a restriction that at least the physical base station 104 be required to receive, from a spectrum controller 112, authorization and/or permission to operate according to a given periodicity (e.g., such as every 300 seconds, every 200 seconds, every 100 seconds, every 50 seconds, amongst other possibilities), may be placed on the respective entity by a government organization. In a context of the United States, such a government organization may be the FCC, though government organizations in other jurisdictions may require similar restrictions. Such government organizations may also place restrictions on certain operating parameters of physical base stations, as described herein, such as a maximum transmission power (and/or maximum radiated power level), and the like.

While in some examples, the computing device 102 may be generally configured to request authorization from only one spectrum controller 112, when that spectrum controller 112 does not respond to an authorization request, for example due to an Internet outage, and the like, and/or for reasons unrelated to authorization being denied, the computing device 102 may needlessly control the physical base station 104 to stop operating (e.g., within a given time period, such as 300 seconds, 200 seconds, 100 seconds, amongst other possibilities, and which may also be dictated by a government organization), leaving the communication devices 108 without communications. Furthermore, when the physical base station 104 is later controlled to start operating, for example, when authorization is later received from the only one spectrum controller 112, the physical base station 104 may need to implement a restart procedure, which may waste time, processing resources and bandwidth at the physical base station 104.

However, to obviate these technical problems, the computing device 102 is generally configured to interface with two or more of the spectrum controllers 112 (e.g., 112-1 and 112-2), for example to provide, to the two or more of the spectrum controllers 112, respective authorization requests associated with the physical base station 104 (e.g., for respective virtual base stations representing the physical base station 104) at the given location and receive, in response, from one or more of the spectrum controllers 112, one or more respective spectrum controller responses to the respective authorization requests. When the one or more respective spectrum controller responses include at least one authorization associated with the physical base station 104, the computing device 102 may provide, to the physical base station 104, permission to operate via respective RF transmissions. Put another way, the computing device 102 may request transmission authorization for the physical base station 104 to operate from a plurality of spectrum controllers 112 (e.g., in the form of respective transmission authorization requests for respective virtual base stations representing the physical base station 104 at the given location), and, as long as one spectrum controller response is received that includes a transmission authorization for the physical base station 104 (e.g., or for an associated virtual base station) to operate, the computing device 102 may provide permission to the physical base station 104 to operate.

Furthermore, the one or more respective spectrum controller responses may include respective operating parameters associated with the physical base station 104 (e.g., for an associated virtual base station) that may take into account the incumbent systems 110 and other secondary users in the band, and the computing device 102 may include, in the permission to the physical base station 104, an indication of one or more of the respective operating parameters to configure the physical base station 104 to provide the respective RF transmissions according to the one or more of the respective operating parameters. Examples of such respective operating parameters, include, but are not limited to: an allowable radiated power level, an allowable frequency range or channel assignment, an allowable occupied bandwidth, and an allowable transmission beamwidth. Note that the approved operating parameters authorized by a spectrum controller 112 may represent maximum allowable levels for the respective authorization (e.g., a maximum effective isotropic radiated power level, over an associated bandwidth and antenna beamwidth). The processing of the respective operating parameters may be performed by the computing device 102, and is illustrated herein at least with respect to FIG. 5. However such respective operating parameters may be determined by the spectrum controllers 112 communicating, under the assumption that each of the respective authorization requests is for a different base station (e.g., respective virtual base stations) located at the given location of the physical base station 104, and which hence take into account RF transmissions of each (e.g., of a virtual base station). As such, when more than one respective spectrum controller response is received that include respective operating parameters associated with the physical base station 104, the computing device 102 may include various suitable combinations of the respective operating parameters with the permission, including, but not limited to, selections, unions or sums thereof. The physical base station 104 receives the permission, and the respective operating parameters, and continues (or starts) operating according to the respective operating parameters.

In some examples, the system 100 may operate according to certain other restrictions. For example, the physical base station 104 may operate under a government organization restriction of requiring that permissions to operate be received according to a given periodicity, as has been previously discussed. In these examples, the computing device 102 may send respective authorization requests to the two or more spectrum controllers 112 according to the given periodicity, and provide authorization permissions to the physical base station 104 according to the given periodicity accordingly (e.g., presuming one or more respective spectrum controller responses include at least one authorization). Alternatively, the computing device 102 may send respective initial spectrum authorization requests to the two or more spectrum controllers 112, and the two or more spectrum controllers 112 may thereafter periodically provide authorizations in response to the initial spectrum authorization requests (e.g., without further spectrum authorization requests being provided by the computing device 102).

Hence the permissions may be colloquially referred to as heartbeat permissions, which, when not received at the physical base station 104 according to particular conditions, such as according to the given periodicity, the physical base station 104 must stop operating, for example within a given time period. Indeed, the heartbeat permissions may be understood as periodic reauthorizations for the physical base station 104 to operate.

Such a decision to stop operating may occur via computing resources at the physical base station 104. Alternatively, as depicted, the system 100 may further comprise a monitoring engine 116, associated with the physical base station 104, the monitoring engine 116 configured to: when a permission to operate is not received within a given time period and/or according to a given periodicity, control the physical base station 104 to stop operating via respective RF transmissions.

In some examples, the monitoring engine 116 may be collocated with the physical base station 104, however in other examples the monitoring engine 116 may be close enough to the physical base station 104 to have provide reliable service to the physical base station 104 and/or have reliable connectivity with the physical base station 104 (reliable communication, a reliable power source, etc.). Put another way, the monitoring engine 116 may have a backup power source such that, when mains power is lost the monitoring engine 116 continues to operate, and/or a communication link with the physical base station 104 that is maintained when other communication links between the physical base station 104 and other components of the system 100 (e.g., the computing device 102) are lost.

Use of the monitoring engine 116 may occur when the physical base station 104 is operated in certain modes. In one possible mode, the physical base station 104 may not monitor the heartbeat permissions and the monitoring engine 116 may hence be used to monitor the heartbeat permissions and provide a command to the physical base station 104 to stop operating when a permission to operate is not received within a given time period and/or according to a given periodicity.

However, when the physical base station is operated in a second possible mode, the physical base station 104 may monitor the heartbeat permissions, and stop operating when a permission to operate is not received within a given time period and/or according to a given periodicity. In these examples, the monitoring engine 116 may be redundant and/or omitted in the system 100. In general, the domain proxy function may perform these functions for multiple base stations, and the domain proxy function may be implemented by the computing device 102.

Figure 2:
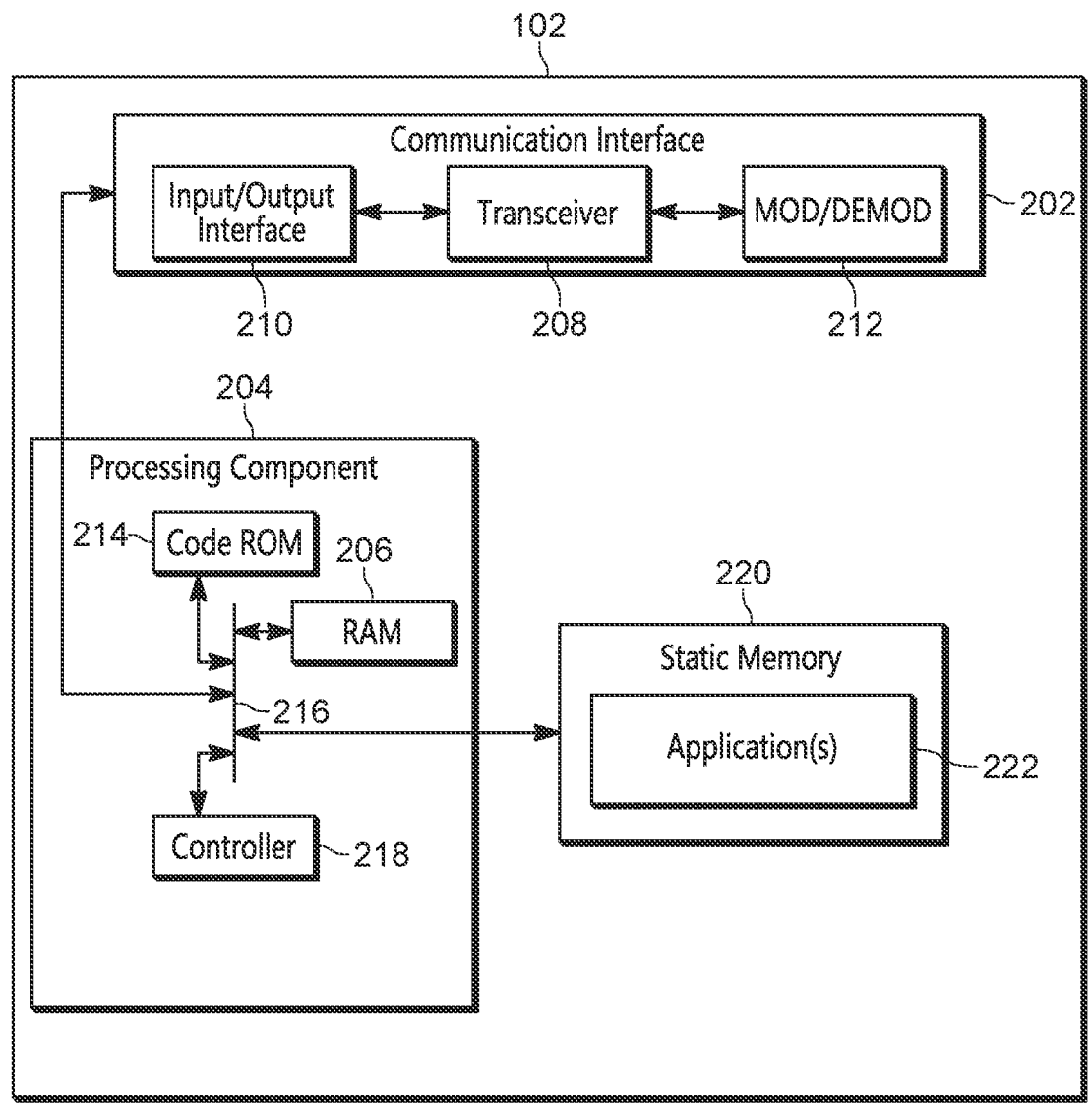
FIG. 2 is a device diagram showing a device structure of a computing device to control operation of a base station, in accordance with some examples.

Attention is next directed to FIG. 2, which depicts a schematic block diagram of an example of the computing device 102. While the computing device 102 is depicted in FIG. 2 as a single component, functionality of the computing device 102 may be distributed among a plurality of components and the like including, but not limited to, any suitable combination of one or more servers, one or more cloud computing devices, on-premises processors, and the like. In some examples, the computing device 102 may be integrated with, and/or may comprise, a base station controller and/or domain proxy function of the physical base station 104. In some examples, the computing device 102 may be a component of a network management system, and the like, and the computing device 102 (or domain proxy function) may control operations of a plurality of base stations, including, but not limited to, the physical base station 104.

As depicted, the computing device 102 comprises: a communication interface 202, a processing unit 204, a Random-Access Memory (RAM) 206, one or more wireless transceivers 208, one or more wired and/or wireless input/output (I/O) interfaces 210, a combined modulator/demodulator 212, a code Read Only Memory (ROM) 214, a common data and address bus 216, a controller 218, and a static memory 220 storing at least one application 222. Hereafter, the at least one application 222 will be interchangeably referred to as the application 222. Furthermore, while the memories 206, 214 are depicted as having a particular structure and/or configuration, (e.g., separate RAM 206 and ROM 214), memory of the computing device 102 may have any suitable structure and/or configuration.

While not depicted, the computing device 102 may include, and/or be in communication with, one or more of an input component and a display screen (and/or any other suitable notification device) and the like.

As shown in FIG. 2, the computing device 102 includes the communication interface 202 communicatively coupled to the common data and address bus 216 of the processing unit 204.

The processing unit 204 may include the code Read Only Memory (ROM) 214 coupled to the common data and address bus 216 for storing data for initializing system components. The processing unit 204 may further include the controller 218 coupled, by the common data and address bus 216, to the Random-Access Memory 206 and the static memory 220.

The communication interface 202 may include one or more wired and/or wireless input/output (I/O) interfaces 210 that are configurable to communicate with other components of the system 100. For example, the communication interface 202 may include one or more wired and/or wireless transceivers 208 for communicating with other suitable components of the system 100. Hence, the one or more transceivers 208 may be adapted for communication with one or more communication links and/or communication networks used to communicate with the other components of the system 100. For example, the one or more transceivers 208 may be adapted for communication with one or more of the Internet, a wired network (e.g., an IEEE 802.3 network), a digital mobile radio (DMR) network, a Project 25 (P25) network, a terrestrial trunked radio (TETRA) network, a Bluetooth network, a Wi-Fi network, for example operating in accordance with an IEEE 802.11 standards (e.g., 802.11a, 802.11b, 802.11g), a 3GPP ($3^{rd}$ Generation Partnership Project) 4G LTE (Long-Term Evolution) network, a 3GPP 5G network (e.g., a network architecture compliant with, for example, the 3GPP TS 23 specification series and/or a new radio (NR) air interface compliant with the 3GPP TS 38 specification series) standard), a Worldwide Interoperability for Microwave Access (WiMAX) network, for example operating in accordance with an IEEE 802.16 standard, and/or other types of GSM (Global System for Mobile communications) and/or another similar type of wireless networks. Hence, the one or more transceivers 208 may include, but are not limited to, a cell phone transceiver, a wired network (e.g., an IEEE 802.3 network) transceiver, a DMR transceiver, P25 transceiver, a TETRA transceiver, a 3GPP transceiver, a 4G LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

The communication interface 202 may further include one or more other wireline transceivers 208, such as a USB (Universal Serial Bus) transceiver, or similar transceiver configurable to communicate via a twisted pair wire, a coaxial cable, a fiber-optic link, or a similar physical connection to a wireline network. The transceiver 208 may also be coupled to a combined modulator/demodulator 212.

The controller 218 may include ports (e.g., hardware ports) for coupling to other suitable hardware components of the system 100.

The controller 218 may include one or more logic circuits, one or more processors, one or more microprocessors, one or more GPUs (Graphics Processing Units), and/or the controller 218 may include one or more ASIC (application-specific integrated circuits) and one or more FPGA (field-programmable gate arrays), and/or another electronic device. In some examples, the controller 218 and/or the computing device 102 is not a generic controller and/or a generic device, but a device specifically configured to implement functionality to control operation of a base station. For example, in some examples, the computing device 102 and/or the controller 218 specifically comprises a computer executable engine configured to implement functionality to control operation of a base station.

The static memory 220 comprises a non-transitory machine readable medium that stores machine readable instructions to implement one or more programs or applications. Example machine readable media include a non-volatile storage unit (e.g., Erasable Electronic Programmable Read Only Memory ("EEPROM"), Flash Memory) and/or a volatile storage unit (e.g., random-access memory ("RAM")). In the example of FIG. 2, programming instructions (e.g., machine readable instructions) that implement the functionality of the computing device 102 as described herein are maintained, persistently, at the memory 220 and used by the controller 218, which makes appropriate utilization of volatile storage during the execution of such programming instructions.

Figure 3:
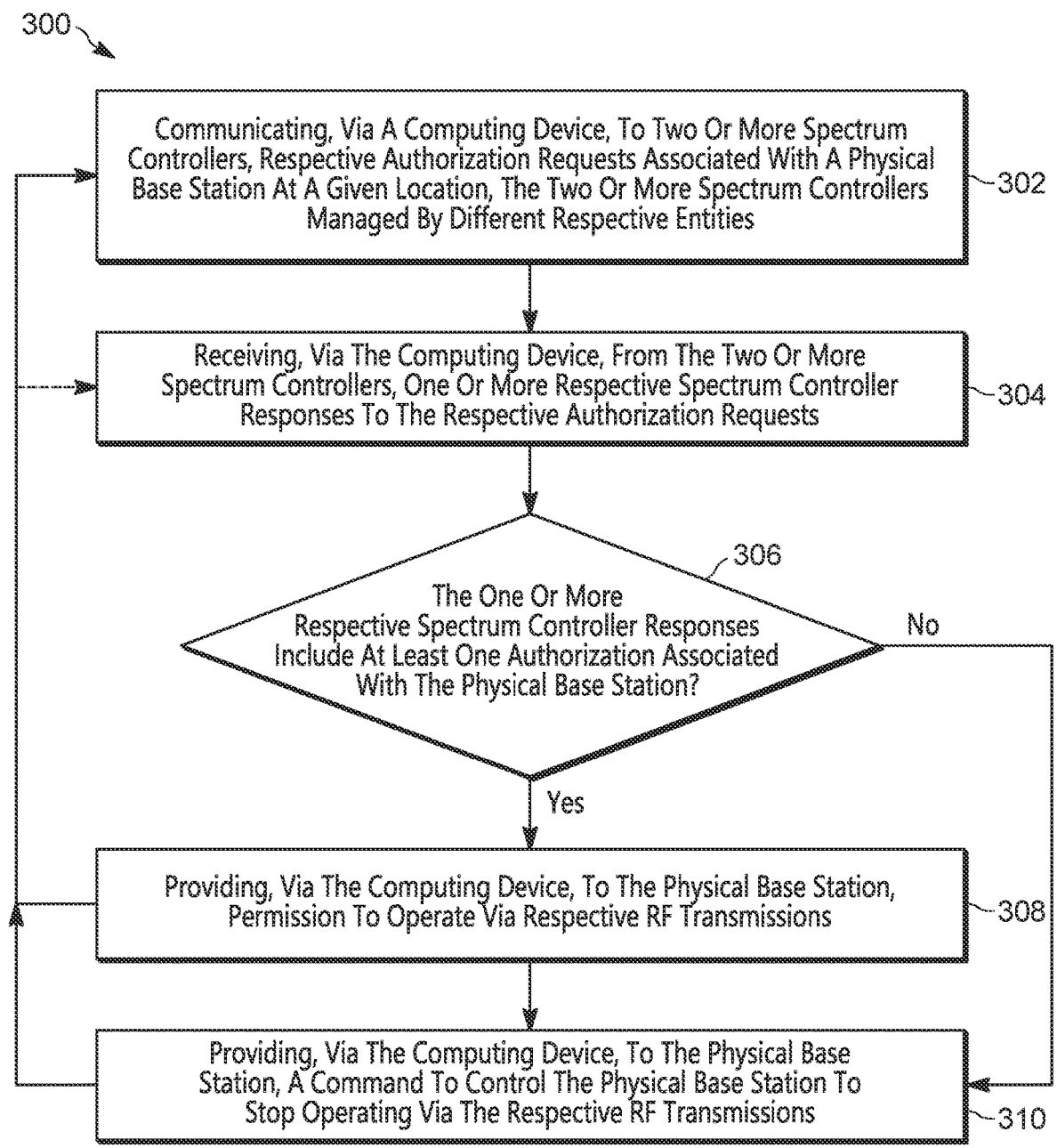
FIG. 3 is a flowchart of a method to control operation of a base station, in accordance with some examples.

Regardless, it is understood that the memory 220 stores instructions corresponding to the at least one application 222 that, when executed by the controller 218, enables the controller 218 to implement functionality to control operation of a base station, including, but not limited to, the blocks of the method set forth in FIG. 3.

While details of the physical base station 104, the communication devices 108, 110, the spectrum controllers 112, and the monitoring engine 116 are not depicted, the physical base station 104, the communication devices 108, 110, the spectrum controllers 112, and the monitoring engine 116 may have components similar to the computing device 102 adapted, however, for the functionality thereof.

Attention is now directed to FIG. 3, which depicts a flowchart representative of a method 300 to control operation of a base station. The operations of the method 300 of FIG. 3 correspond to machine readable instructions that are executed by the computing device 102, and specifically the controller 218 of the computing device 102. In the illustrated example, the instructions represented by the blocks of FIG. 3 are stored at the memory 220 for example, as the application 222. The method 300 of FIG. 3 is one way that the controller 218 and/or the computing device 102 and/or the system 100 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

Furthermore, while the method 300 is described with respect to the physical base station 104, the method 300 may be implemented for a plurality of physical base stations. For example, the computing device 102 (e.g., which may include a domain proxy function) may be implementing the method 300 to control operation of the physical base station 104, as well as to control operation of other physical base stations.

At a block 302, the controller 218, and/or the computing device 102, communicates (e.g., via the communication interface 202), to two or more spectrum controllers 112, respective authorization requests associated with a physical base station 104 at a given location, the two or more spectrum controllers 112 managed by different respective entities. In the CBRS band, such communication with the spectrum controllers 112 may be accomplished via secure protocols such as HTTPS (Hypertext Transfer Protocol Secure) or TLS (Transport Layer Security). In some examples, the two or more spectrum controllers 112 may be in communication to coordinate radio-frequency (RF) transmissions at the given location.

At a block 304, the controller 218, and/or the computing device 102, receives (e.g., via the communication interface 202), from the two or more spectrum controllers 112, one or more respective spectrum controller responses to the respective authorization requests.

At a block 306, the controller 218, and/or the computing device 102, determines whether the one or more respective spectrum controller responses include at least one authorization associated with the physical base station 104. An authorization generally includes a permission to transmit for the base station 104. The spectrum controllers responses may also include other operating parameters, such as the maximum allowable transmission power (or radiated power levels), the maximum allowable transmission bandwidth, the allowable transmission frequencies (or channels), the maximum allowable transmission beamwidth, and the like.

When the one or more respective spectrum controller responses include at least one authorization associated with the physical base station 104 (e.g., a "YES" decision at the block 306), at a block 308, the controller 218, and/or the computing device 102, provides (e.g., via the communication interface 202), to the physical base station 104, permission to operate via respective RF transmissions.

Returning to the block 306, when the one or more respective spectrum controller responses do not include at least one authorization associated with the physical base station 104, and/or when none of the respective spectrum controller responses are received, (e.g., a "NO" decision at the block 306), at a block 310, the controller 218, and/or the computing device 102, provides (e.g., via the communication interface 202), to the physical base station 104, a command to control the physical base station 104 to stop operating via the respective RF transmissions.

After the blocks 308, 310, the method 300 is understood to repeat from the block 302 and/or the block 304. For example, the controller 218, and/or the computing device 102 may communicate (e.g., at the block 302) the respective authorization requests to the two or more spectrum controllers 112 periodically, and responsively receive (e.g., at the block 304) the one or more respective spectrum controller responses periodically. In these examples, the method 300 repeats from the block 302.

Alternatively, the computing device 102 may communicate (e.g., at the block 302) respective initial spectrum authorization requests to the two or more spectrum controllers 112, and the two or more spectrum controller 112 may thereafter periodically provide respective spectrum controller responses in response to the respective initial spectrum authorization requests (e.g., without further spectrum authorization requests being provided by the computing device 102), such that the controller 218, and/or the computing device 102, receives (e.g., at the block 304) the respective spectrum controller responses periodically in response to the respective initial spectrum authorization requests. In these examples, the method 300 repeats from the block 304, for example as indicated by the dashed line from the blocks 308, 310 to the block 304.

When the block 310 is implemented and the physical base station 104 stops operating due to a "NO" decision at the block 306, when a "YES" decision later occurs at the block 306, implementation of the block 308 causes the physical base station 104 to again start operating.

Furthermore, the method 300 may be repeated (e.g., from the block 302 or the block 304) according to a given periodicity, for example to maintain a given periodicity of heartbeat permissions as described herein.

Aspects of the method 300 will next be described with respect to FIG. 4, FIG. 5, FIG. 6, FIG. 7, and FIG. 8. FIG. 4, FIG. 5, FIG. 6, FIG. 7, and FIG. 8 are similar to FIG. 1, with like components having like numbers, however FIG. 4, FIG. 5, FIG. 6, FIG. 7, and FIG. 8 depict a particular example of the computing device 102 and/or the system 100 as is next described.

Attention is next directed to FIG. 4, which depicts the computing device 102 operating a domain proxy orchestrator engine 402 and one or more domain proxy engines 404-1, 404-2 (e.g., the domain proxy engines 404 and/or a domain proxy engine 404). The term "domain proxy" is used with respect to the domain proxy engines 404 as the domain proxy engines 404 generally request authorizations to operate, from the spectrum controllers 112, on behalf of one or more physical base stations 104 (e.g., the domain proxy engines 404 act as respective proxies for the one or more physical base stations 104). For simplicity, the present example of the domain proxy orchestrator engine 402 and the domain proxy engines 404 is described in terms of interfacing with the spectrum controllers 112 on behalf of single physical base station 104, although the domain proxy orchestrator engine 402 and the domain proxy engines 404 can service any suitable number of physical base stations (e.g., 10, 100, 1000, amongst other possibilities). Similarly, the term "domain proxy orchestrator" is used with respect to the domain proxy orchestrator engine 402 as domain proxy orchestrator engine 402 generally orchestrate and/or manage system controller responses, from the spectrum controllers 112, on behalf of the physical base station 104 (e.g., the domain proxy orchestrator engine 402 may also act as a respective proxy for the physical base station 104).

Indeed, in the following discussion, it is understood that functionality being described as implemented by the domain proxy orchestrator engine 402 and the one or more domain proxy engines 404 is being implemented by the computing device 102 (e.g., and/or the controller 218).

Furthermore, the computing device 102 may maintain, as depicted, data indicative of respective virtual base stations 408-1, 408-2 (e.g., virtual base stations 408, a virtual base station 408) representing the physical base station 104 at the given location of the physical base station 104. Put another way, while the virtual base stations 408 are depicted as a component of the computing device 102, the virtual base stations 408 may comprise data files that include operational capabilities of the respective virtual base stations 408, which may be the same as the operating capabilities of the physical base station 104, such as a same maximum RF transmission power level, same bandwidth capabilities, same antenna beamwidth capabilities, and the like, amongst other possibilities, and which may further include, but is not limited to, antenna height, pointing angles, bandwidth patterns, and the like of the physical base station 104.

However, in other examples, such operational capabilities of the virtual base stations 408 may be different from each other, but with operational capabilities generally being less than, but within respective ranges, of the operational capabilities of the physical base station 104.

Regardless, the virtual base stations 408 are generally understood to have different respective serial numbers, for example, as depicted, "SN1" for the first virtual base station 408-1 and "SN2" for the second virtual base station 408-2. Furthermore, the virtual base stations 408, their respective serial numbers, and their respective operational capabilities may be registered with the spectrum controllers 112 (e.g., in lieu of, or in addition to, a serial number and respective operational capabilities of the physical base station 104). Such registration may occur via the one or more domain proxy engines 404.

Indeed, in the context of CBRS networks, the virtual base station approach, with different serial numbers, may be used since SASs (e.g., the spectrum controllers 112) may be restricted from allowing a same physical base station (e.g., of a given serial number) from being registered on more than one SAS (e.g., which may depend on the particular SAS implementation). In this manner, the spectrum controllers 112 and/or SASs may determine that more than one base stations is located at the given location of the physical base station 104, and determine operating parameters of the virtual base stations 408, accordingly (and individually), as described herein. Note that this approach does not violate FCC rules for the CBRS band, since the interference contributions for each virtual base station 112 are generally taken into account by the SASs. Thus, no harmful interference will occur.

However, in examples where the spectrum controllers 112 are not restricted from allowing a same physical base station (e.g., of a given serial number) from being registered on more than one spectrum controller 112, the virtual base station approach may not be used; rather, authorization requests, as described herein, may be respectively for the physical base station 104, using a same serial number for the physical base station 104.

When the virtual base station approach is used, a number of the virtual base stations 408 may be the same as a number of the spectrum controllers 112. Hence, as two spectrum controllers 112 are depicted, two virtual base stations 408 are also depicted. However, the approach may be extended to more than two virtual base stations 408 or more than two spectrum controllers 112.

Similarly, two domain proxy engines 404 are depicted, for example, one domain proxy engine 404 for each virtual base station 408 and/or spectrum controller 112. However, in other examples, the computing device 102 may operate as few as one domain proxy engine 404, which may combine the functionality of the two domain proxy engines 404. In this manner, a single domain proxy engine 404 may interface to more than one spectrum controller 112.

In particular, the one or more domain proxy engines 404 are generally configured to communicate respective authorization requests to the two or more spectrum controllers 112. Hence, for example, the first domain proxy engine 404-1 may communicate (e.g., at the block 302 of the method 300) respective authorization requests to the first spectrum controller 112-1 requesting authorization for the first virtual base station 408-1 to operate, and the second domain proxy engine 404-2 may communicate respective authorization requests to the second spectrum controller 112-2 requesting authorization for the second virtual base station 408-2 to operate. It is further understood that the respective authorization requests for the virtual base stations 408 to operate represent respective authorization requests for the physical base station 104 to operate. Hence, the respective authorization requests are understood to be associated with the physical base station 104.

However, the spectrum controllers 112 process the respective authorization requests for the virtual base stations 408 to operate as if there were a same number of respective physical base stations, as there are virtual base stations 408, located at the given location of the physical base station 104, the respective physical base stations having the operating capabilities of the virtual base stations 408, as registered with the spectrum controllers 112.

The domain proxy engines 404 furthermore may receive (e.g., at the block 304 of the method 300) the spectrum controller responses from the spectrum controllers 112, and provide the spectrum controller responses to the domain proxy orchestrator engine 402, which, hence, may also receive (e.g., at the block 304 of the method 300) the spectrum controller responses from the spectrum controllers 112.

Indeed, the domain proxy orchestrator engine 402 may generate the respective authorization requests, which may be provided to the domain proxy engines 404 for transmission to the spectrum controllers 112. Indeed, in some examples, the domain proxy engines 404 may be combined with the domain proxy orchestrator engine 402; in such examples, the domain proxy engines 404 may be replaced with respective domain proxy interfaces, and the like, between the domain proxy orchestrator engine 402 and the spectrum controllers 112. As such, it is understood that functionality of the domain proxy orchestrator engine 402 and the domain proxy engines 404 may be combined in any suitable manner at the computing device 102.

In general, the domain proxy orchestrator engine 402 receives and coordinates the one or more respective spectrum controller responses. The domain proxy orchestrator engine 402 furthermore determines (e.g., at the block 306 of the method 300) whether the one or more respective responses include the at least one authorization to transmit. The domain proxy orchestrator engine 402 further provides (e.g., at the block 308 of the method 300), to the physical base station 104, the permission to operate (e.g., when a "YES" decision occurs at the block 306 of the method 300).

Similarly, the domain proxy orchestrator engine 402 may further provide (e.g., at the block 310 of the method 300), to the physical base station 104, a command to stop operating (e.g., when a "NO" decision occurs at the block 306 of the method 300).

Hence, at the method 300, in some examples, the respective authorization requests (e.g., of the block 302) may be associated with respective virtual base stations 408 representing the physical base station 104 at the given location, the respective virtual base stations 408 having different respective serial numbers. However, such respective authorization requests are understood to be further associated with physical base station 104 at the given location.

Furthermore, the method 300 may further comprise, the controller 218 and/or the computing device 102: operating a domain proxy orchestrator engine 402 and one or more domain proxy engines 404, wherein the one or more domain proxy engines 404 communicate the respective authorization requests to the two or more spectrum controllers 112, wherein the respective authorization requests are associated with respective virtual base stations 408 representing the physical base station 104 at the given location, the respective virtual base stations 408 having different respective serial numbers, and wherein the domain proxy orchestrator engine 402 coordinates the one or more respective spectrum controller responses; determines whether the one or more respective responses include the at least one authorization; and provides, to the physical base station 104, the permission to operate.

Figure 5:
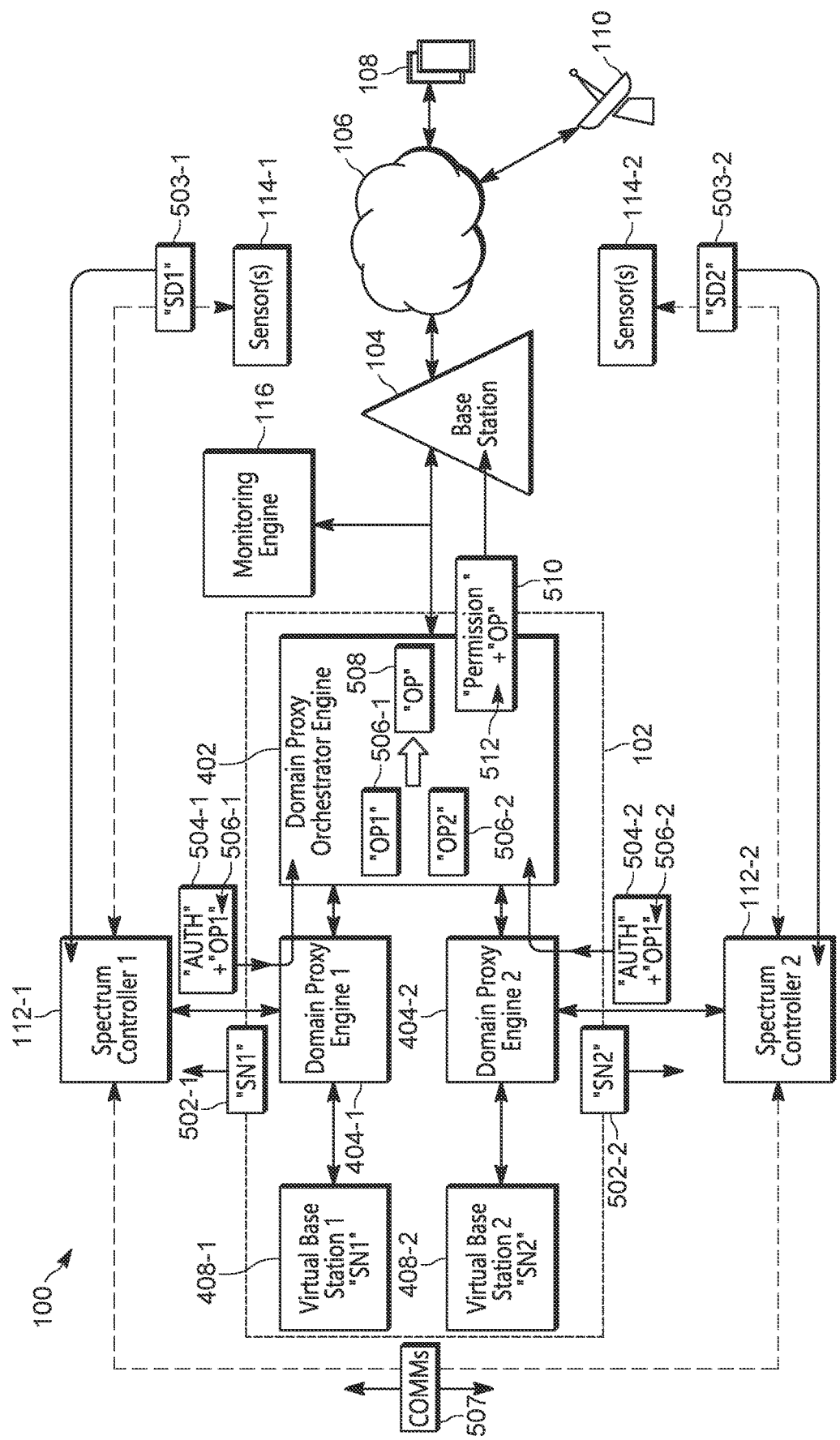
FIG. 5 depicts the system of FIG. 4, implementing aspects of a method to control operation of a base station, in accordance with some examples.

Attention is next directed to FIG. 5, in which aspects of the method 300 are described in further detail.

As depicted, respective authorization requests 502-1, 502-2 (e.g., authorization requests 502 and/or an authorization request 502) are communicated (e.g., at the block 302 of the method 300) to the spectrum controllers 112-1, 112-2, for example by, or via, the domain proxy engines 404-1, 404-2. The authorization requests 502 may be communicated according to the aforementioned given periodicity.

In particular, a first authorization request 502-1 communicated to the first spectrum controller 112-1 includes the serial number "SN1" of the first virtual base station 408-1, and a second authorization request 502-2 communicated to the second spectrum controller 112-2 includes the serial number "SN2" of the second virtual base station 408-2. As also depicted in FIG. 5, the first spectrum controller 112-1 may receive first sensor data 503-1 from the first sensors 114-1, and the second spectrum controller 112-2 may receive second sensor data 503-2 (e.g., sensor data 503 and/or a set of sensor data 503) from the second sensors 114-2.

The spectrum controllers 112 receive the authorization requests 502 and the sensor data 503, among other data, and determine whether or not authorization is to be granted for the virtual base stations 408 to operate. In some examples, the spectrum controllers 112 may share sensor data 503. In other examples, detection of certain types of incumbent operation may occur through the use of informing databases (e.g., a spectrum reservation system that incumbents may utilize to indicate location, and the like, amongst other possibilities), and the like. In such examples, the sensors 114 and/or sensor networks, and the like, may or may not be utilized in the system 100 and/or may not be present in the system 100.

In some examples, authorization may be denied, for example, when the spectrum controllers 112 can determine no operating parameters of the virtual base stations 408 (e.g., from operating capabilities associated with the serial numbers "SN1", "SN2" and the sensor data 503) that would cause corresponding physical base stations, at the given location of the physical base station 104, to operate without interfering with the incumbent systems 110 (or other higher tier users in the band of the network 106). This scenario is described herein with respect to FIG. 8.

However, as depicted in FIG. 5, the spectrum controllers 112 may determine operating parameters of the virtual base stations 408 (e.g., from operating capabilities associated with the serial numbers "SN1", "SN2" and the sensor data 503) that would cause corresponding physical base stations, at the given location of the physical base station 104, to operate without interfering with the incumbent systems 110 (and/or other higher tier users in the band). Hence, the spectrum controllers 112 may provide, in response to the respective authorization requests respective spectrum controller responses 504-1, 504-2 (e.g., spectrum controller responses 504 and/or a spectrum controller response 504) that, as depicted, may include respective operating parameters 506-1, 506-2 (e.g., operating parameters 506 and/or a respective operating parameters 506) for the of the virtual base stations 408. Potential operating parameters may include, but are not limited to: an approved operating frequency range (or channel), an approved maximum transmission power level (or radiated power level), an approved maximum operating bandwidth (and/or an approved operating frequency range), an improved maximum operating antenna beamwidth (and horizontal or vertical azimuth). For example, as depicted in FIG. 5, the first spectrum controller 112-1 provides a first spectrum controller response 504-1 that includes an authorization (e.g., "AUTH") for the first virtual base station 408-1 to operate and respective first operating parameters 506-1 for the first virtual base station 408-1, and the second spectrum controller 112-2 provides a second spectrum controller response 504-2 that includes an authorization (e.g., "AUTH") for the second virtual base station 408-2 to operate and respective second operating parameters 506-2 for the second virtual base station 408-2.

In particular, the spectrum controllers 112 may communicate with each other, for example as depicted in FIG. 5 via communications 507 (e.g., and labelled "COMMs" in FIG. 5) to coordinate spectrum usage and power usage at the given location of the physical base station 104, to ensure that base stations at the given location of the physical base station 104 do not interfere with communications of the incumbent systems 110.

Furthermore, while two spectrum controller response 504 are depicted, as few as one spectrum controller response 504 may be received. Hence, the spectrum controller response 504 may be referred to as the one or more respective spectrum controller responses 504. This scenario is described with respect to FIG. 6.

In the context of a CBRS network, the spectrum controller responses 504 may be referred to as spectrum grants, and may include (but are not limited to), for example as the operational parameters 506, maximum allowable transmit power (e.g., expressed as an Effective Isotropic Radiated Power (EIRP)), an operating bandwidth, an operating beamwidth, and channel frequency or range of frequencies for a particular transceiver and/or sector of a physical base station.

In the context of an AFC network, the sensor data 503 and the communications 507 are understood to be optional, and furthermore, the operational parameters 506 may be predetermined, and configured at the spectrum controllers 112, and may include, but are not limited to, at least a maximum allowable transmit power, amongst other possibilities.

As depicted, the respective spectrum controller responses 504 are received (e.g., at the block 304 of the method 300) at the domain proxy orchestrator engine 402, and as both of the respective spectrum controller responses 504 include a respective authorization, the domain proxy orchestrator engine 402 may determine (e.g., a "YES" decision at the block 306 of the method 300) that permission may be provided to the physical base station 104 to operate.

Furthermore, the respective operating parameters 506 are understood to be determined via the spectrum controllers 112 communicating, such that the respective operating parameters 506 are selected so that two corresponding physical base stations (e.g., corresponding to the virtual base stations 408) operating at the given location of the physical base station 104, according to the respective operating parameters 506, will not interfere with communications of the incumbent systems 110 (or other higher tier spectrum users). Hence, as depicted, the respective operating parameters 506 may be combined in any suitable manner to determine operating parameters 508 for the physical base station 104.

The domain proxy orchestrator engine 402 provides (e.g., at the block 308 of the method 300), to the physical base station 104, a permission 510 (e.g., in the form of a message, and the like) for the physical base station 104 to operate. As depicted, the permission 510 includes an indication 512 of the operating parameters 508. The indication 512 may comprise the operating parameters 508, and/or the indication 512 may comprise a command to change current operating parameters of the physical base station 104 to the operating parameters 508, and may be in any suitable format (e.g., such as a difference between the current operating parameters of the physical base station 104 and the operating parameters 508; such examples assume that the domain proxy orchestrator engine 402 and/or the computing device 102 generally store, and/or have access to, the current operating parameters of the physical base station 104).

The physical base station 104 receives the permission 510 and the indication 512 of the operating parameters 508. The physical base station 104 hence continues to operate (e.g., or begins to operate) due to receipt of the permission 510, and furthermore such operations occur according to the operating parameters 508 as indicated by the indication 512. When the operating parameters 508 are different from current operating parameters of the physical base station 104, the physical base station 104 is controlled (e.g., by respective processing resources) to operate according to the operating parameters 508. In this manner, the physical base station 104 is controlled to operate.

Determination of the operating parameters 508 is next described, for example in the context of the communications 507 and/or a CBRS network.

For example, the respective operating parameters 506 may include, but are not limited to, respective power level parameters for the physical base station 104 (e.g., in a form of respective transmission power level parameters for a respective virtual base station 408), respective bandwidth grant parameters for the physical base station 104 (e.g., in a form of respective bandwidth grant parameters for a respective virtual base station 408), respective antenna beamwidth grant parameters for the physical base station 104 (e.g., in a form of respective antenna beamwidth grant parameters for a respective virtual base station 408), amongst other possibilities.

Hence, for example, the first operating parameters 506-1 may include a first respective power level parameter, first respective bandwidth grant parameters, and a first respective antenna beamwidth grant parameters, amongst other possibilities. Similarly, the second operating parameters 506-2 may include a second respective power level parameter, second respective bandwidth grant parameters, and a second respective antenna beamwidth grant parameters, amongst other possibilities. Such operating parameters 506 may be combined by the domain proxy orchestrator engine 402 in any suitable manner.

For example, the one or more respective spectrum controller responses 504 may include respective power level parameters, for example in the operating parameters 506, associated with the physical base station 104.

In general, the respective power level parameters may not be larger than respective power level capability of the individual virtual base stations 408, and furthermore, in some examples, when summed, a total power level of respective power level capability may not be larger than a respective power level capability of the physical base station 104, and, for example a maximum power level of RF transmissions that the physical base station 104 is capable of transmitting. In the case of operation in the CBRS band, the EIRP level of transmissions may be limited by a spectrum controller 112, and FCC Regulations for the band (e.g., according to Part 96 rules).

Indeed, in some examples, and assuming two virtual base stations 408, the respective power level capability of the individual virtual base stations 408 may each be 50% of the respective power level capability of the physical base station 104. Put another way, when the data files representing the individual virtual base stations 408 are generated, the respective power level capability of the individual virtual base stations 408 may each be 50% (i.e., 3 dB less) of the respective power level capability of the physical base station 104. More generally, when there are "N" virtual base stations 408 (e.g., for "N" spectrum controllers 112), the respective power level capability of the "N" number of individual virtual base stations 408 may each be 1/N of the respective power level capability of the physical base station 104.

However, the respective power level capability of the individual virtual base stations 408 may be any suitable value, and a total thereof may be in a range of a power level of RF transmissions that the physical base station 104 is capable of transmitting.

Furthermore, the spectrum controllers 112 may cooperate (e.g., via the communications 507) to select the respective power level parameters of the individual virtual base stations 408 as has been previously described.

As such, the domain proxy orchestrator engine 402 and/or the computing device 102 has authorization to use one, or both of the respective power level parameters received in the operating parameters 506, up to a maximum of a sum of respective power level parameters. However, other restrictions may apply. For example, a government organization may restrict a total of a power level of RF transmissions of physical base stations, and the spectrum controllers 112 may or may not take such a restricted total power level into account when determining the respective power level parameters received in the operating parameters 506. In these examples, the domain proxy orchestrator engine 402 and/or the computing device 102 may sum power levels of the operating parameters 506 to determine a power level parameter of the operating parameters 508 and, when the sum is greater than a restricted total power, the domain proxy orchestrator engine 402 and/or the computing device 102 may adjust the power level parameter of the operating parameters 508 to the restricted total power.

Regardless, in these examples, the method 300 may further comprise the controller 218 and/or the computing device 102 (e.g., and/or the domain proxy orchestrator engine 402): summing respective power levels indicated by the respective power level parameters (e.g., of the operating parameters 506) to obtain a summed power level; and including, in the permission 510 to operate, provided to the physical base station 104, an indication 512 of the summed power level to configure the physical base station 104 to provide the respective RF transmissions according to the summed power level. In general, the maximum allowable transmission power level (or maximum radiated power level) may be summed for all authorized spectrum controller responses.

In some examples, the respective power level parameters (e.g., of the operating parameters 506) may be different. For example the respective power level capability of the virtual base stations 408 may be different, and/or the spectrum controllers 112 may determine different allowed power level results to avoid interference, and the spectrum controllers 112 may determine the respective power level parameters, of the operating parameters 506, accordingly. In these examples, the domain proxy orchestrator engine 402 and/or the computing device 102 may select the largest of the respective power level parameters. Hence, in these examples, the method 300 may further comprise the controller 218 and/or the computing device 102 (e.g., and/or the domain proxy orchestrator engine 402): selecting a largest power level of the respective power levels (of the respective authorized spectrum controller responses 504); and including, in the permission 510 to operate, provided to the physical base station 104, an indication 512 of the largest power level to configure the physical base station 104 to provide the respective RF transmissions according to the largest power level. Selection of the largest power level may continue to be restricted to a restricted total power, and the like.

Furthermore, such respective power level parameters and/or power levels may be in the form of EIRP, and associated units, and/or in any other suitable format.

In a particular example, respective power level parameters of different authorized operating parameters 506 may comprise 75 W (e.g., Watts) and 25 W, and hence a power level parameter of the operating parameters 508 may be 100 W (e.g., 75 W+25 W), or 75 W, or 25 W. When a power level parameter of the operating parameters 508 is initially 100 W, but the physical base station 104 is restricted to a maximum power (e.g., by a government organization) of 80 W for example, the power level parameter of the operating parameters 508 may be adjusted (e.g., by the domain proxy orchestrator engine 402 and/or the computing device 102) to 80 W.

In other examples, the one or more respective spectrum controller responses 504 may include, in the respective operating parameters 506, respective bandwidth grant parameters associated with the physical base station 104 (e.g., respective bandwidth grant parameters for the virtual base stations 408). Examples of respective bandwidth grant parameters may include, but are not limited to, spectrum grants, such as a range of bandwidths and/or channels over which the physical base station 104 may operate. Returning to the example of a CBRS network, such a network may have a bandwidth and/or spectrum of 150 MHz (3550 MHz to 3700 MHZ), divided into fifteen 10 MHz channels. The incumbent systems 110 may be operating on certain channels, and the respective bandwidth grant parameters of the respective operating parameters 506 may indicate other channels different from those on which the incumbent systems 110 may be operating. Furthermore, the respective bandwidth grant parameters of the respective operating parameters 506 may be the same or different from each other.

In some examples, when different bandwidth grant parameters of the respective operating parameters 506 are provided, the method 300 may further comprise the controller 218 and/or the computing device 102 (e.g., and/or the domain proxy orchestrator engine 402): selecting a largest bandwidth grant parameter of the respective bandwidth grant parameters; and including, in the permission 510 to operate, provided to the physical base station 104, an indication of the largest bandwidth grant parameter to configure the physical base station 104 to provide the respective RF transmissions according to the largest bandwidth grant parameter.

However, when the bandwidth grant parameters of the respective operating parameters 506 are the same, the method 300 may further comprise the controller 218 and/or the computing device 102 (e.g., and/or the domain proxy orchestrator engine 402): selecting a one bandwidth grant parameter of the respective bandwidth grant parameters; and including, in the permission 510 to operate, provided to the physical base station 104, an indication of the one bandwidth grant to configure the physical base station 104 to provide the respective RF transmissions according to the one bandwidth grant.

However, when the bandwidth grant parameters of the respective operating parameters 506 are different, the method 300 may alternatively comprise the controller 218 and/or the computing device 102: determining a combined bandwidth grant parameter on two or more channels from the respective bandwidth grant parameters; and including, in the permission 510 to operate, provided to the physical base station 104, an indication 512 of the combined bandwidth grant parameter to configure the physical base station 104 to provide the respective RF transmissions according to the combined bandwidth grant parameter. In these scenarios, the physical base station 104 may operate according to a wider bandwidth than indicated by the bandwidth grant parameters of the respective operating parameters 506 taken alone.

In a particular example, using a CBRS network, the authorized bandwidth grant parameters of the respective operating parameters 506 may comprise 3550-3570 MHz (e.g., 20 MHz or the 2 lowest channels in the CBRS band) and 3570-3600 MHz (e.g., 30 MHz or 3 channels in the CBRS band), and hence a bandwidth grant parameter of the operating parameters 508 may be 3550-3600 MHZ (e.g., a 50 MHz grant for a 5G NR system, combining the 20 MHz and 30 MHz grants). The bandwidth grant parameter included in the operating parameters 508 may be selected to be the largest of such bandwidth grant parameters. In other examples, the two bandwidth grant parameters may be overlapping, in which case a union of the two bandwidth grant parameters may be utilized. In such combined bandwidth examples, the physical base station 104 may generally be restricted to operate with a smallest of the authorized transmission power levels in order to maintain compliance with the two or more spectrum controller authorizations (e.g., of the responses 504). In other examples, the bandwidth grant parameters may be discontiguous in the band, which may require the use of two RF carriers to utilize (depending on the transceiver architecture of the physical base station 104).

In yet further examples, the one or more respective spectrum controller responses 504 may include, in the respective operating parameters 506, respective antenna beamwidth grant parameters associated with the physical base station 104 (e.g., respective antenna beamwidth grant parameters for the virtual base stations 408). For example, a respective antenna beamwidth grant parameter may define a beamwidth and/or one or more given sectors over which the physical base station 104 may operate (e.g., to transmit RF transmissions, and the like), for example to not interfere with communications of the incumbent systems 110. For example, the incumbent systems 110 may be offshore on naval vessels, and a beamwidth and/or one or more given sectors over which the physical base station 104 may operate may be in a direction away from the incumbent systems 110 offshore on naval vessels.

Similar to other operating parameters, one respective antenna beamwidth grant parameter may be selected, or the respective antenna beamwidth grant parameters may be combined. There may further generally be an azimuth associated with each antenna beamwidth that is granted by the spectrum controllers 112. In a particular example, the method 300 may further comprise the controller 218 and/or the computing device 102 (e.g., and/or the domain proxy orchestrator engine 402): determining a combined antenna beamwidth grant parameter for two or more antenna beamwidths from the respective antenna beamwidth grant parameters; and including, in the permission 510 to operate, provided to the physical base station 104, an indication of the combined antenna beamwidth grant parameter to configure the physical base station 104 to provide the respective RF transmissions according to the combined antenna beamwidth grant parameter. In this manner, selectable, mechanically steerable or adaptive antenna (e.g., electronically steerable) antennas may be utilized by the physical base station 104 to combine the beamwidth of two or more spectrum controller authorizations (e.g., of the responses 504). In general, the combining of beamwidths may occur in the horizontal (e.g., azimuth) or vertical (e.g., elevation) planes, and the power spectral density limits over each granted beamwidth must be respected. In some examples, the granted beamwidths may be overlapping, and the physical base station 104 may use any suitable portion (e.g. a combination and/or union) of the granted beamwidths. In other cases, the granted beamwidths may not be overlapping.

In a particular example, respective antenna beamwidth grant parameters of different operating parameters 506 may comprise a first sector of the first virtual base station 408-1 (e.g., which may correspond to a first sector of the physical base station 104 that is pointing away from a coastline), and comprise a second sector of the second virtual base station 408-2 (e.g., which may correspond to a second sector of the physical base station 104 that is also pointing away from a coastline). Hence an antenna beamwidth grant parameter of the operating parameters 508 may be "Sector 1 and Sector 2", or "Sector 1", or "Sector 2", where each sector may represent a 120 degree or 60 degree horizontal sweep of coverage (e.g., a 3 or 6-sector cell). The antenna beamwidth grant parameter included in the operating parameters 508 may be selected to be the largest of such antenna beamwidth grant parameters. While for simplicity the provided antenna beamwidth grant parameter example is with respect to sectors of the physical base station 104, in other examples, an antenna beamwidth grant parameter may with respect to angles (e.g., a full width half maximum of sectors of the physical base station 104, and the like).

Indeed, in general, the one or more respective spectrum controller responses 504 may include respective operating parameters 506 associated with the physical base station 104, and the method 300 may further comprise the controller 218 and/or the computing device 102 (e.g., and/or the domain proxy orchestrator engine 402): including, in the permission to operate, provided to the physical base station 104, an indication 512 of one or more of the respective operating parameters 506 to configure the physical base station 104 to provide the respective RF transmissions according to the one or more of the respective operating parameters 506. In general, the respective spectrum controller responses 504 from the two or more spectrum controllers 122 may be monitored by the domain proxy orchestrator engine 402 at least as often as the spectrum controllers 112 are queried by the domain proxies 404-1 and 404-2 (e.g., which may be determined by local regulations for the operating band).

Figure 6:
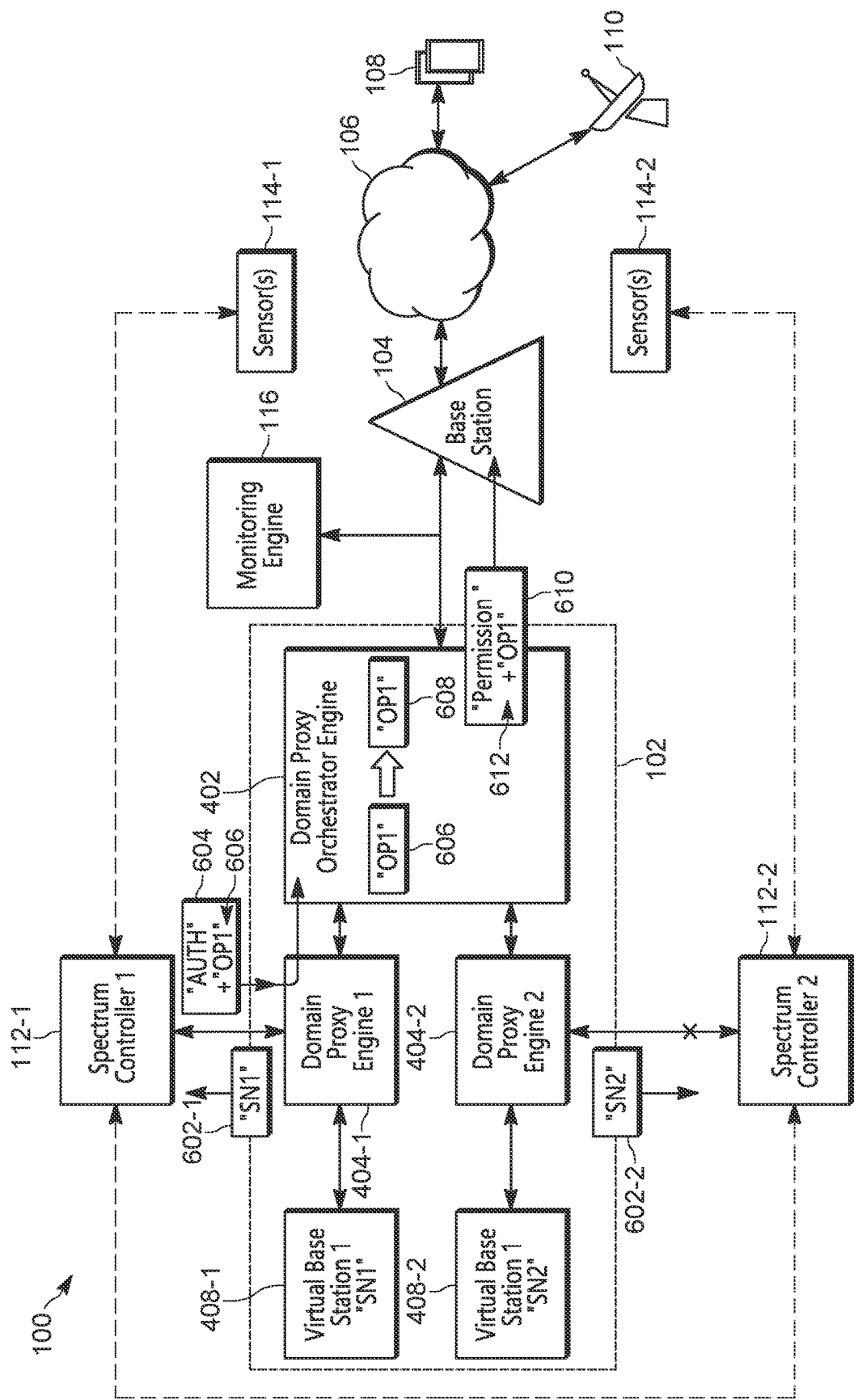
FIG. 6 depicts the system of FIG. 4, implementing further aspects of a method to control operation of a base station, in accordance with some examples.

Attention is next directed to FIG. 6, which depicts other aspects of the method 300. In FIG. 6, similar to the example of FIG. 5, respective authorization requests 602-1, 602-2 (e.g., authorization requests 602 and/or an authorization request 602) are communicated (e.g., at the block 302 of the method 300) to the spectrum controllers 112-1, 112-2, for example by, or via, the domain proxy engines 404-1, 404-2. However, in contrast to the example of FIG. 5, an Internet outage, and the like, between the computing device 102 and the second spectrum controller 112-2 (as represented by an "X" on a communication link therebetween) may cause the second spectrum controller 112-2 to not receive the respective authorization request 602-2 and/or to not provide a spectrum controller response. Similarly, an outage in server software of the spectrum controller 112-2 may cause a lack of response from that spectrum controller 112-2, in which case similar actions are taken by the domain proxy orchestrator engine 402. e.g., Rather, in the example of FIG. 6, only one respective spectrum controller response 604 is received (e.g., at the block 304 of the method 300) from the first spectrum controller 112-1, which includes an authorization (e.g., "AUTH") and respective operating parameters 606 (e.g., "OP1"). The spectrum controller response 604 and the operating parameters 606 may be similar to, respectively, the respective spectrum controller response 504-1 and the respective operating parameters 506-1 described with respect to FIG. 5.

Furthermore, as the respective spectrum controller response 604 includes a respective authorization, the domain proxy orchestrator engine 402 may determine (e.g., a "YES" decision at the block 306 of the method 300) that permission may be provided to the physical base station 104 to operate.

Furthermore, the domain proxy orchestrator engine 402 may determine operating parameters 608 for the physical base station 104 from the operating parameters 606 (e.g., as depicted the operating parameters 608 may be the same as the operating parameters 606, as indicated by "OP1" for each).

The domain proxy orchestrator engine 402 provides (e.g., at the block 308 of the method 300) a permission 610 to the physical base station 104, which may include an indication 612 of the operating parameters 608, the domain proxy orchestrator engine 402.

Figure 7:
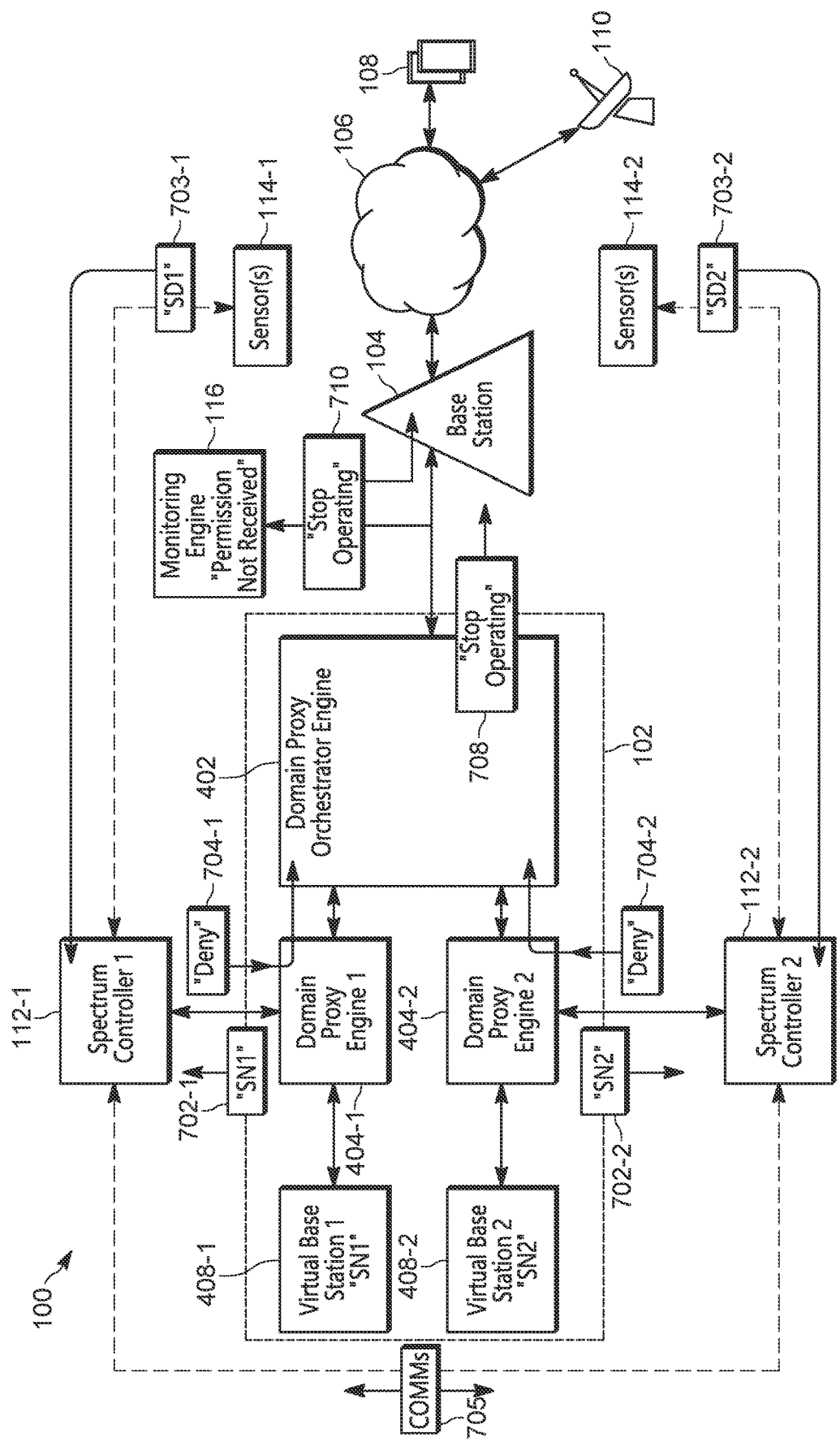
FIG. 7 depicts the system of FIG. 4, implementing yet further aspects of a method to control operation of a base station, in accordance with some examples.
Figure 8:
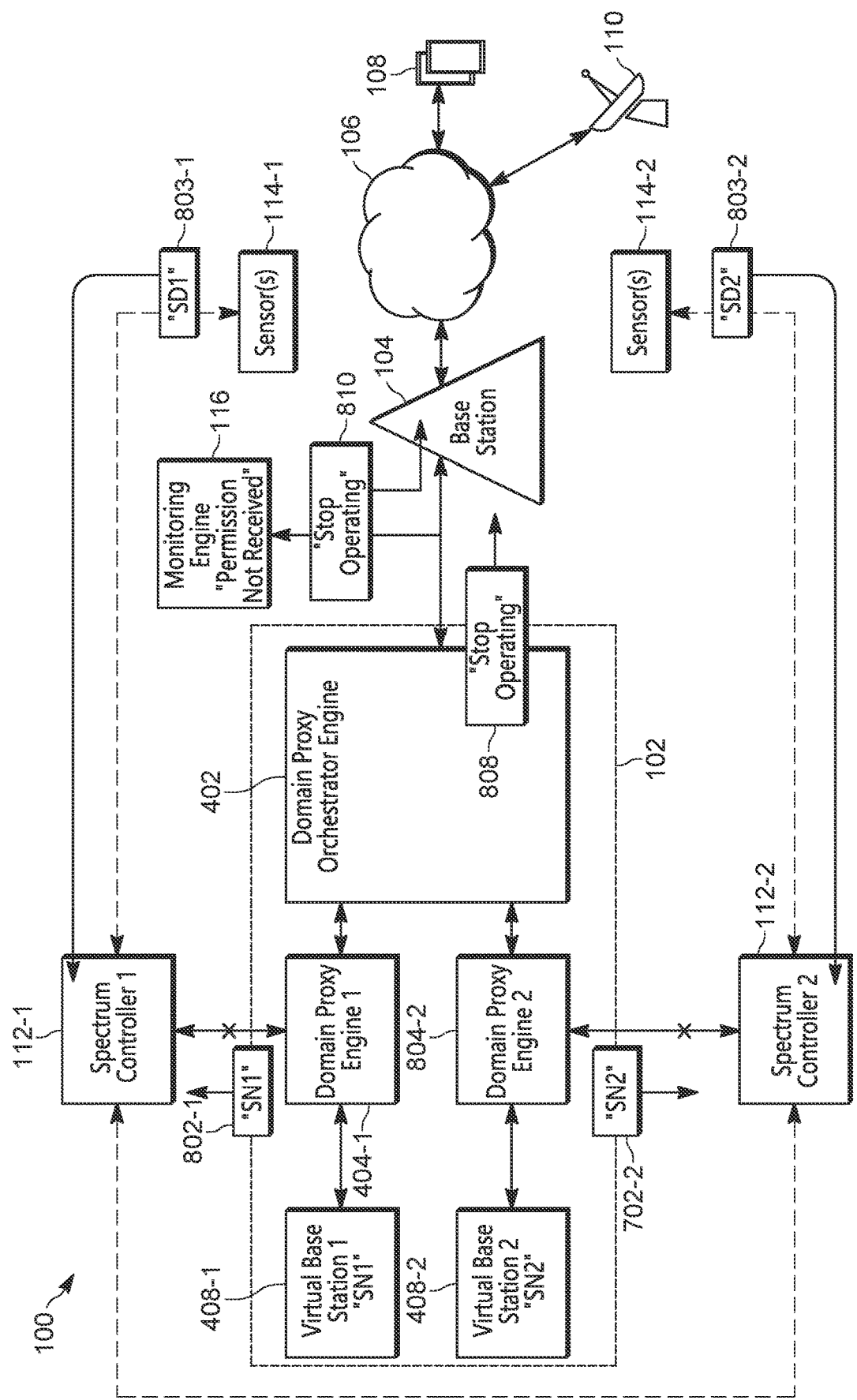
FIG. 8 depicts the system of FIG. 4, implementing yet further aspects of a method to control operation of a base station, in accordance with some examples.

Attention is next directed to FIG. 7 and FIG. 8, which depict respectively examples the block 310 of the method 300, for example when respective spectrum controller responses do not include an authorization for the physical base station 104 to operate and/or when no respective spectrum controller responses are received.

For example, in FIG. 7, similar to the example of FIG. 5, respective authorization requests 702-1, 702-2 (e.g., authorization requests 702 and/or an authorization request 702) are communicated (e.g., at the block 302 of the method 300) to the spectrum controllers 112-1, 112-2, for example by, or via, the domain proxy engines 404-1, 404-2. However, in contrast to the example of FIG. 5, respective sensor data 703-2, 703-2 may indicate to the spectrum controllers 112-1, 112-2 that there is no combination of operating parameters for the virtual base stations 408 that will not interfere with communications of the incumbent systems 110 (or higher tier systems). Hence, respective spectrum controller responses 704-1, 704-2 (e.g., respective spectrum controller responses 704 and/or a respective spectrum controller response 704) generated by the spectrum controllers 112-1, 112-2, and received at the domain proxy orchestrator engine 402 (e.g., at the block 304 of the method 300) do not include an authorization. Rather, as depicted, the spectrum controller responses 704 deny such an authorization (e.g., as indicated by "DENY" at the spectrum controller responses 704). Furthermore, such decisions to deny authorization may occur via communications 705 between the spectrum controllers 112.

As the spectrum controller responses 704 deny authorization, the domain proxy orchestrator engine 402 (e.g., the computing device 102) may determine that none of the respective spectrum controller responses 704 include an authorization (e.g., a "NO decision at the block 306 of the method 300). Hence, the domain proxy orchestrator engine 402 (e.g., the computing device 102) provides (e.g., at the block 310 of the method 300), to the physical base station 104, a command 708 to control the physical base station 104 to stop operating via the respective RF transmissions (e.g., as indicated by text "Stop Operating").

Alternatively, or in addition, the monitoring engine 116 may be monitoring heartbeat permissions and/or whether permissions are received from the computing device 102, for example according to the aforementioned given periodicity. As depicted, the monitoring engine 116 is determining that that a permission has not been received according to the aforementioned given periodicity, as indicated by text "Permission Not Received". As such, the monitoring engine 116 may control the physical base station 104 to stop operating via the respective RF transmissions; for example, as depicted, the monitoring engine 116 may provide, to the physical base station 104, a command 710 to control the physical base station 104 to stop operating via the respective RF transmissions (e.g., as indicated by text "Stop Operating").

Attention is next directed to FIG. 8, in which, similar to the example of FIG. 5, respective authorization requests 802-1, 802-2 (e.g., authorization requests 802 and/or an authorization request 802) are communicated (e.g., at the block 302 of the method 300) to the spectrum controllers 112-1, 112-2, for example by, or via, the domain proxy engines 404-1, 404-2. However, in contrast to the example of FIG. 5, an Internet outage, and the like, may prevent the spectrum controllers 112-1, 112-2 from providing respective spectrum controller responses, though respective sensor data 803-2, 803-2 may (or may not) continue to be received. In particular, an authorization request 802 may not be received at a spectrum controller 112 and/or when an authorization request 802 is received, a spectrum controller 112 may not be able to respond.

As such, the domain proxy orchestrator engine 402 (e.g., the computing device 102) may determine that no respective spectrum controller responses have been received (e.g., within a given time period that is less than the aforementioned periodicity), and/or that no respective spectrum controller responses have been received that include an authorization (e.g., a "NO decision at the block 306 of the method 300). Hence, the domain proxy orchestrator engine 402 (e.g., the computing device 102) may provide (e.g., at the block 310 of the method 300), to the physical base station 104, a command 808 to control the physical base station 104 to stop operating via the respective RF transmissions. However, in some of these examples, the command 808 may not be generated; rather, the domain proxy orchestrator engine 402 and/or the computing device 102 may timeout waiting for spectrum controller responses.

Alternatively, or in addition, the monitoring engine 116 may be monitoring heartbeat permissions, and/or whether permissions are received from the computing device 102, for example according to the aforementioned given periodicity. As depicted, the monitoring engine 116 is determining that that a permission has not been received according to the aforementioned given periodicity, as indicated by text "Permission Not Received". As such, the monitoring engine 116 may control the physical base station 104 to stop operating via the respective RF transmissions; for example, as depicted, the monitoring engine 116 may provide, to the physical base station 104, a command 810 to control the physical base station 104 to stop operating via the respective RF transmissions (e.g., as indicated by text "Stop Operating").

It is furthermore understood that the domain proxy engines 404 and/or computing device 102 may communicate periodic authorization requests to the spectrum controllers 112, which may, or may not, respond with respective spectrum controller responses, and which may, or may not, result in heartbeat permissions that may be monitored by the monitoring engine 116 and/or the computing device 102. Alternatively, the domain proxy engines 404 and/or computing device 102 may communicate respective initial authorization requests to the spectrum controllers 112, which may cause the spectrum controllers 112 to determine an authorization state for the location of the physical base station 104 periodically and the spectrum controllers 112 may provide periodic with respective spectrum controller responses, and which may, or may not, result in heartbeat permissions that may be monitored by the monitoring engine 116 and/or the computing device 102.

Indeed, one or more of the monitoring engine 102 and the computing device 102 may implement a timer (e.g., which may be referred to as a watchdog timer), which monitors periodicity of the heartbeat permissions, and when a heartbeat permission is not received according to a given periodicity, as monitored by the timer, one or more of monitoring engine 102 and the computing device 102 determine may transmissions by the physical base station 104, as described herein.

As should be apparent from this detailed description above, the operations and functions of electronic computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, process spectrum controller responses, and the like).

In the foregoing specification, specific examples have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/or hardware. For example, instead of being located within and performed by a single electronic processor, logic and processing described herein may be distributed among multiple electronic processors. Similarly, one or more memory modules and communication channels or networks may be used even if embodiments described or illustrated herein have a single such device or element. Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together). Similarly the terms "at least one of" and "one or more of", without a more limiting modifier such as "only one of", and when applied herein to two or more subsequently defined options such as "at least one of A or B", or "one or more of A or B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   communicating, via a computing device, to two or more spectrum controllers, respective authorization requests associated with a physical base station at a given location,
   the two or more spectrum controllers managed by different respective entities;
   receiving, via the computing device, from the two or more spectrum controllers, one or more respective spectrum controller responses to the respective authorization requests;
   when the one or more respective spectrum controller responses include at least one authorization associated with the physical base station, providing, via the computing device, to the physical base station, permission to operate via respective RF transmissions; and
   operating, via the computing device, a domain proxy orchestrator engine and one or more domain proxy engines,
   wherein the one or more domain proxy engines communicate the respective authorization requests to the two or more spectrum controllers,
   wherein the respective authorization requests are associated with respective virtual base stations representing the physical base station at the given location, the respective virtual base stations having different respective serial numbers, and wherein the domain proxy orchestrator engine coordinates the one or more respective spectrum controller responses;

determines whether the one or more respective spectrum controller responses include the at least one authorization; and provides, to the physical base station, the permission to operate.

2. The method of claim 1, wherein the one or more respective spectrum controller responses include respective operating parameters associated with the physical base station, and the method further comprises:

including, in the permission to operate, provided to the physical base station, an indication of one or more of the respective operating parameters to configure the physical base station to provide the respective RF transmissions according to the one or more of the respective operating parameters.

3. The method of claim 1, wherein the one or more respective spectrum controller responses include respective power level parameters associated with the physical base station, and the method further comprises:

selecting a largest power level of the respective power levels; and including, in the permission to operate, provided to the physical base station, an indication of the largest power level to configure the physical base station to provide the respective RF transmissions according to the largest power level.

4. The method of claim 1, wherein the one or more respective spectrum controller responses include respective power level parameters associated with the physical base station, and the method further comprises:

summing respective power levels indicated by the respective power level parameters to obtain a summed power level; and including, in the permission to operate, provided to the physical base station, an indication of the summed power level to configure the physical base station to provide the respective RF transmissions according to the summed power level.

5. The method of claim 1, wherein the one or more respective spectrum controller responses include respective bandwidth grant parameters associated with the physical base station, and the method further comprises:

selecting a largest bandwidth grant parameter of the respective bandwidth grant parameters; and including, in the permission to operate, provided to the physical base station, an indication of the largest bandwidth grant parameter to configure the physical base station to provide the respective RF transmissions according to the largest bandwidth grant parameter.

6. The method of claim 1, wherein the one or more respective spectrum controller responses include respective bandwidth grant parameters associated with the physical base station, and the method further comprises:

determining a combined bandwidth grant parameter on two or more channels from the respective bandwidth grant parameters; and including, in the permission to operate, provided to the physical base station, an indication of the combined bandwidth grant parameter to configure the physical base station to provide the respective RF transmissions according to the combined bandwidth grant parameter.

7. The method of claim 1, wherein the one or more respective spectrum controller responses include respective antenna beamwidth grant parameters associated with the physical base station, and the method further comprises:

determining a combined antenna beamwidth grant parameter for two or more antenna beamwidths from the respective antenna beamwidth grant parameters; and including, in the permission to operate, provided to the physical base station, an indication of the combined antenna beamwidth grant parameter to configure the physical base station to provide the respective RF transmissions according to the combined antenna beamwidth grant parameter.

8. The method of claim 1, further comprising:

when the one or more respective spectrum controller responses do not include at least one authorization associated with the physical base station, or, when none of the respective spectrum controller responses are received, providing, via the computing device, to the physical base station, a command to control the physical base station to stop operating via the respective RF transmissions.

9. The method of claim 1, further comprising:

when the one or more respective spectrum controller responses do not include at least one authorization associated with the physical base station, or, when none of the respective spectrum controller responses are received, providing, via the computing device, to the physical base station, a command to control the physical base station to stop operating via the respective RF transmissions.

10. A computing device comprising:

a controller; and a non-transitory computer-readable storage medium having stored thereon program instructions that, when executed by the controller, cause the computing device to perform a set of operations comprising:

communicating, to two or more spectrum controllers, respective authorization requests associated with a physical base station at a given location, the two or more spectrum controllers managed by different respective entities;

receiving, from the two or more spectrum controllers, one or more respective spectrum controller responses to the respective authorization requests;

when the one or more respective spectrum controller responses include at least one authorization associated with the physical base station, providing, to the physical base station, permission to operate via respective RF transmissions; and operating a domain proxy orchestrator engine and one or more domain proxy engines, wherein the one or more domain proxy engines communicate the respective authorization requests to the two or more spectrum controllers, wherein the respective authorization requests are associated with respective virtual base stations representing the physical base station at the given location, the respective virtual base stations having different respective serial numbers, and wherein the domain proxy orchestrator engine coordinates the one or more respective spectrum controller responses;

determines whether the one or more respective spectrum controller responses include the at least one authorization; and provides, to the physical base station, the permission to operate.

11. The computing device of claim 10, wherein the one or more respective spectrum controller responses include respective operating parameters associated with the physical base station, and the set of operations further comprises:
including, in the permission to operate, provided to the physical base station, an indication of one or more of the respective operating parameters to configure the physical base station to provide the respective RF transmissions according to the one or more of the respective operating parameters.

12. The computing device of claim 10, wherein the one or more respective spectrum controller responses include respective power level parameters associated with the physical base station, and the set of operations further comprises:
selecting a largest power level of the respective power levels; and
including, in the permission to operate, provided to the physical base station, an indication of the largest power level to configure the physical base station to provide the respective RF transmissions according to the largest power level,
or the set of operations further comprises:
summing respective power levels indicated by the respective power level parameters to obtain a summed power level; and
including, in the permission to operate, provided to the physical base station, an indication of the summed power level to configure the physical base station to provide the respective RF transmissions according to the summed power level.

13. The computing device of claim 10, wherein the one or more respective spectrum controller responses include respective bandwidth grant parameters associated with the physical base station, and the set of operations further comprises:
selecting a largest bandwidth grant parameter of the respective bandwidth grant parameters; and
including, in the permission to operate, provided to the physical base station, an indication of the largest bandwidth grant parameter to configure the physical base station to provide the respective RF transmissions according to the largest bandwidth grant parameter,
or the set of operations further comprises:
determining a combined bandwidth grant parameter on two or more channels from the respective bandwidth grant parameters; and
including, in the permission to operate, provided to the physical base station, an indication of the combined bandwidth grant parameter to configure the physical base station to provide the respective RF transmissions according to the combined bandwidth grant parameter.

14. A system comprising:
a physical base station at a given location;
a computing device configured to:
communicate, to two or more spectrum controllers, respective authorization requests associated with the physical base station;
receive, from the two or more spectrum controllers, one or more respective responses to the respective authorization requests;
when the one or more respective responses include at least one authorization associated with the physical base station, provide, to the physical base station, permission to operate via respective radio-frequency (RF) transmissions,
wherein the two or more spectrum controllers are managed by different respective entities; and
operate a domain proxy orchestrator engine and one or more domain proxy engines,
wherein the one or more domain proxy engines communicate the respective authorization requests to the two or more spectrum controllers,
wherein the respective authorization requests are associated with respective virtual base stations representing the physical base station at the given location,
the respective virtual base stations having different respective serial numbers, and
wherein the domain proxy orchestrator engine coordinates the one or more respective responses;
determines whether the one or more respective responses include the at least one authorization; and
provides, to the physical base station, the permission to operate.

15. The system of claim 14, further comprising:
a monitoring engine associated with the physical base station, the monitoring engine configured to: when the permission to operate is not received within a given time period or according to a given periodicity, control the physical base station to stop operating via the respective RF transmissions.

16. The system of claim 14, wherein the two or more spectrum controllers are in communication to coordinate radio-frequency (RF) transmissions at the given location.

* * * * *